United States Patent [19]
Uchiyama

[11] Patent Number: 5,640,618
[45] Date of Patent: Jun. 17, 1997

[54] FOCUS STATE DETECTION DEVICE AND METHOD

[75] Inventor: Shigeyuki Uchiyama, Tokyo, Japan

[73] Assignee: Nikon Corporation, Tokyo, Japan

[21] Appl. No.: 497,442

[22] Filed: Jun. 30, 1995

[30] Foreign Application Priority Data

Sep. 7, 1994 [JP] Japan .................................. 6-214064

[51] Int. Cl.⁶ .............................. G03B 3/00; G03B 13/18
[52] U.S. Cl. ........................ 396/122; 396/96; 396/121; 396/123; 396/128
[58] Field of Search ........................... 354/400–410

[56] References Cited

U.S. PATENT DOCUMENTS

| | | | |
|---|---|---|---|
| 4,980,716 | 12/1990 | Suzuki et al. | 354/403 |
| 5,083,150 | 1/1992 | Nagasaki et al. | 354/402 |
| 5,367,153 | 11/1994 | Suda et al. | 354/407 |
| 5,469,240 | 11/1995 | Uchiyama et al. | 354/406 |
| 5,481,329 | 1/1996 | Uchiyama et al. | 354/402 |
| 5,485,002 | 1/1996 | Kusaka | 354/402 |
| 5,485,003 | 1/1996 | Kusada | 354/408 |
| 5,508,506 | 4/1996 | Kusaka | 354/400 |

Primary Examiner—Safet Metjahic
Assistant Examiner—Michael Dalakis
Attorney, Agent, or Firm—Oliff & Berridge

[57] ABSTRACT

A defocus amount is accurately determined within the photo field. As applied to a focus state detection device, DC reduction filter process data is computed without completely extracting the DC component of the signal string output from an image sensor. The DC reduction filter process data is divided into three regions, and a determination is made as to whether focus state detection is possible for each region. When the determination is negative, a determination is made as to whether focus state detection is possible for all regions of first filter process data that extracts high frequency components. When the determination is negative, a determination is made in a similar manner as to whether focus state detection is possible on the basis of second filter process data and third filter process data. When the determination has been made that focus state detection is possible for all regions with one of the filter process data, a standard block is set, a weighing coefficient is set for each block on the basis of this standard block, the defocus amount of each block is altered, the defocus amounts are combined, and a final defocus amount is determined.

20 Claims, 23 Drawing Sheets

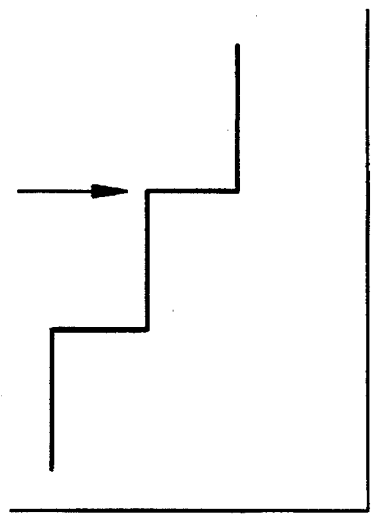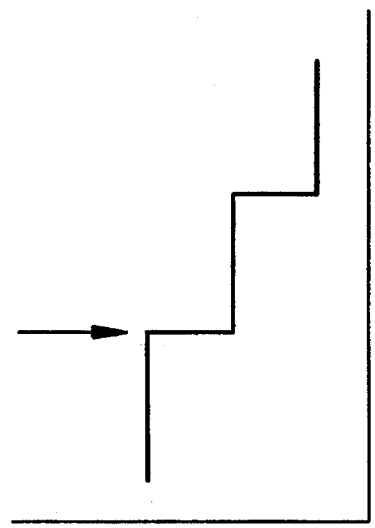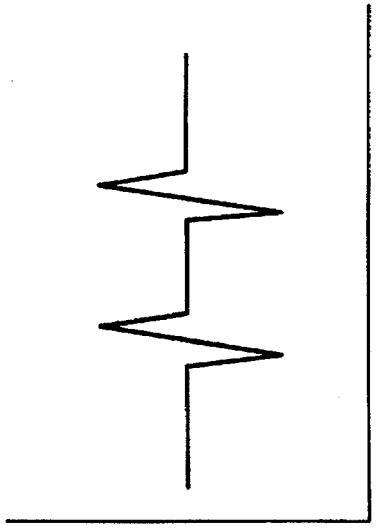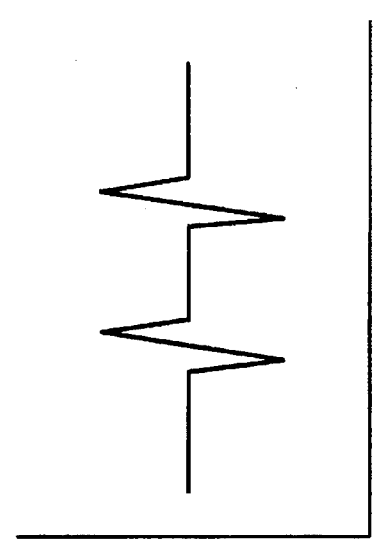

FOCUS STATE DETECTION DEVICE AND METHOD

BACKGROUND OF THE INVENTION

1. Field of the Invention

The present invention relates to a focus state detection device that can be used in a camera or video equipment or the like.

2. Description of Related Art

One method of focus state detection in a camera is the phase-difference detection method, which will be described with reference to FIG. 14. Light rays that are incident on a region 101 of a shooting lens 100 pass through a field mask 200, a field lens 300, an aperture stop 401 and a re-imaging lens 501 and are composed into an image on an image sensor array A, in which a plurality of photoelectric conversion elements are lined up in a linear manner. Similarly, light rays that are incident on a region 102 of shooting lens 100 pass through field mask 200, field lens 300, an aperture stop 402 and a re-imaging lens 502, and are composed into an image on an image sensor array B. From each image sensor array A and B is output a string of signals in accordance with the intensity distribution of the incident light.

The subject images composed on image sensor arrays A and B become relatively farther apart when shooting lens 100 is in a so-called front focus state with a clear image of the subject being composed in front of the predetermined focus plane; and conversely, the images become relatively closer together when the shooting lens is in a so-called rear focus state with a clear image of the subject being composed behind the predetermined focus plane. When the shooting lens is in focus with a clear composed subject, that is, when the shooting lens is exactly at the predetermined focus plane, the subject images on image sensor arrays A and B relatively coincide. Accordingly, it is possible to know the focus adjustment state of the shooting lens and to know the amount and direction by which the shooting lens is separated from an in-focus state (hereafter called the defocus amount) by photoelectrically converting the pair of subject images on image sensor arrays A and B into electrical signals, performing algorithm processes on the electric signals, and determining the relative position shift amount of the pair of subject images.

In addition, the projected images from re-imaging lenses 501 and 502 of image sensor arrays A and B are such that said images overlap near the predetermined focus plane, and the overlapping region is generally the dotted line region in the center of the photo field shown in FIG. 13, this region being called the focus state detection area.

Next, the algorithm process method used in determining the defocus amount will be described.

Image sensor arrays A and B are each composed of a plurality of photoelectric conversion elements, and each output a plurality of output signal strings $a[1], \ldots, a[n]$, $b[1], \ldots, b[n]$ (see FIGS. 15(a) and 15(b)). The correlation algorithm is conducted while causing data in a predetermined range within this pair of signal strings to relatively shift by predetermined data number L, and correlation amount C[L] is found. Calling 1 max the maximum shift number, the range of L is −1 max to 1 max. Specifically, correlation amount C[L] can be computed from formula 1.

$$C[L] = \sum_{i=k}^{r} |a[i+L] - b[i]| \quad (1)$$

$$L = -l\max, \ldots, -2, -1, 0, 1, 2, \ldots, l\max$$

The L in formula 1 is an integer corresponding to the above-described shift amount in the data strings. The first term k and the last term r can be changed by the value of shift amount L, as indicated by formulae 2 to 5, for example.

When $L \geq 0$:

$$k = k0 + INT\{-L/2\} \quad (2)$$

$$r = r0 + INT\{-L/2\} \quad (3)$$

When $L < 0$ $$k = k0 + INT\{(-L+1)/2\} \quad (4)$$

$$r = r0 + INT\{(-L+1)/2\} \quad (5)$$

Here, k0 and r0 indicate the first and last terms when shift amount L=0.

FIG. 16 is a drawing showing the combination of arrays A and B on which difference determining algorithms have been conducted using formula 1, in the cases where the first term k and the last term r are changed by the above-described formulae 2 to 5. In this way, the ranges used in correlation algorithm for array A and array B are shifted in relatively opposite directions accompanying changes in shift amount L.

There is also a method wherein the first term k and the last term r are held constant regardless of the shift amount L, and in this case, the range used in correlation algorithms in one of the arrays is held constant, so that only the other array is shifted.

Because the relative position shift amount becomes shift amount L when a pair of data items match, the shift amount L is detected, which yields the correlation amount having the smallest value out of correlation amounts C[L] found using formula 1, and the defocus amount is the value obtained by multiplying this value by a constant determined from the optical system shown in FIG. 14 and the pitch width of the photoelectric conversion elements in the image sensor arrays. Hence, it is possible to detect large defocus amounts the larger the maximum shift number lmax is.

However, the correlation amounts C[L], which are computed using formula 1, are discrete values as shown in FIG. 15(c), and the smallest unit of the defocus amounts that can be detected is limited by the pitch width of the photoelectric conversion elements in the image sensor arrays A and B. A method wherein precision focus state detection is performed by conducting an interpolation algorithm on the basis of the discrete correlation amounts C[L] and in which a new truly smallest value Cex is calculated, is proposed in Japanese Laid-Open Patent Publication No. 60-37513, corresponding to U.S. Pat. No. 4,561,749. This is a method wherein the true smallest value Cex and the shift amount Ls are calculated from formulae 6 to 9 using correlation amount C[l], which is the smallest amount, and correlation amounts C[l+1] and C[l−1], which are the shift amounts to either side, as shown in FIG. 17.

$$DL = (C[l-1] - C[l+1])/2 \quad (6)$$

$$Cex = C[l] - |DL| \quad (7)$$

$$E = MAX\{C[l+1] - C[l], C[l-1] - C[l]\} \quad (8)$$

$$Ls = l + DL/E \quad (9)$$

In formula 8, MAX{Ca, Cb} means to select the larger of Ca and Cb. The defocus amount DF can be calculated from formula 10 using the shift amount Ls of above-described formula 9.

$$DF = Kf \times Ls \qquad (10)$$

In formula 10, Kf is a constant found from the pitch width of the photoelectric conversion elements in the image sensor arrays and the focus state detecting optical system shown in FIG. 14.

Next, because it is necessary to determine whether the defocus amount obtained using formula 10 represents the true defocus amount or whether it is merely a fluctuation in the correlation amount caused by noise or the like, a determination is made that the computed defocus amount has a high level of confidence only when the conditions shown in formula 11 are satisfied.

$$E > E1 \text{ and } Cex/E < G1 \qquad (11)$$

In formula 11, E1 and G1 are predetermined threshold values. In addition, the numerical value E shows the condition of the change in the correlation amount and is found from above-described formula 8. This numerical value E indicates the information amount contributed to the algorithms in formulae 6 to 9 and depends on the contrast in the subject. Consequently, the contrast is high and the level of confidence is high the larger the numerical value E is. Hereafter, numerical value E is called the information amount.

The value Cex of formula 11 indicates the difference when the pair of outputs from the image sensor arrays most nearly agree. The value Cex originally is 0. However, because of the effects of noise and because there is parallax between region 101 and region 102, a minute difference is created between the pair of subject images, so that in actuality this value does not become 0. Because the effects of noise and the difference in subject images are smaller the larger the contrast in the subject is, Cex/E is used as the numerical value indicating agreement between outputs from the pair of image sensor arrays. Naturally, the closer Cex/E is to 0, the higher the level of confidence and the greater the agreement between the outputs of the pair of image sensor arrays.

The determination of level of confidence can also be conducted by computing the contrast for one of the outputs from the pair of image sensor arrays in place of information amount E. When the determination is made that a high level of confidence exists, driving of shooting lens 100, or a display, is conducted on the basis of the defocus amount DF. Hereafter, the correlation algorithm, the interpolation algorithm and the condition determination of above-described formulae 1 to 11 together will be called the focus state detection algorithm.

Because in general the pair of data items is configured to agree when the shift amount L is essentially 0 with shooting lens 100 in an in-focus state, when shooting lens 100 has been focussed, it is impossible for shooting lens 100 to focus on the subject if the subject image is not composed within the range from the first term k0 to the last term r0 in the shift amount L=0 of image sensor arrays A and B. Accordingly, the area where focus state detection is conducted can be determined by the first term k0 and the last term r0. Hereafter, the data range between the first term k0 and the last term r0 when the shift amount L=0 will be called the algorithm range, and if the subject is in the region corresponding to the algorithm range on the photo field, this region becomes the focus state detection area because focus state detection is performed with respect to this subject. On the viewfinder screen, the focus state detection area is displayed as a focus state detection frame such as the solid line portion in the center of the photo field in FIG. 13, and it is possible for the photographer to effect focussing of the shooting lens on the desired subject by determining the composition so that the subject is inside this detection frame.

However, with this kind of focus state detection device, the shift amount of the pair of output signals differs depending on the position of the image sensor arrays when a plurality of subjects of varying distances are composed into images on the image sensor arrays. Consequently, a shift amount so that the pair of data items agrees does not exist, and the above-described value Cex becomes a large value. Accordingly, Cex/E does not satisfy the conditions of formula 11, and focus state detection may become impossible.

Hence, a method is disclosed in Japanese Patent Publication No. 60-262004 wherein the focus state detecting regions are subdivided by dividing the outputs of the pair of image sensor arrays each into a plurality of blocks, the defocus amount DF is calculated by conducting the focus state detection calculation on each of these blocks, and the block with a defocus amount indicating the closest distance or the block with the maximum numerical value E, for example, is selected out of this plurality of blocks. The defocus amount of this block is set as the focus state detection condition of the shooting lens, and driving of the shooting lens or a display is conducted in accordance with the above-described defocus amount.

Dividing into blocks is equivalent to forming a plurality of sets of initial terms k0 and last terms r0 in the shift amount L=0 in the correlation algorithm of above-described formula 1. For example, as shown in FIG. 23(a), in order to conduct the focus state detection algorithm by dividing the pair of image arrays each comprised of 46 data items into five blocks each composed of eight data items, the focus state detection algorithms from formulae 1 to 11 are conducted by setting k0=4 and r0=11 in block 1; and similarly, the settings k0=12 and r0=19, k0=20 and r0=27, k0=28 and r0=35, and k0=36 and r0=43, are set in blocks 2, 3, 4 and 5, respectively.

It is possible to create larger blocks in the same pair of image sensor arrays than in the case shown in FIG. 23(a), for example by dividing the arrays into three blocks each composed of 14 data items with block 1 being k0=3 to r0=16, block 2 being k0=17 to r0=30 and block 3 being k0=31 to r=44, as shown in FIG. 23(b).

However, when the boundary positions of the blocks are fixed at the time of block division, it becomes impossible to conduct focus state detection when the contrast of the subject is positioned at the boundary of a block, or there are cases where unstable algorithm results are obtained. Consequently, a method is disclosed in Japanese Laid-Open Patent Publication No. 2-135311, corresponding to U.S. Pat. No. 5,068,682, wherein the absolute value of the difference between adjacent data items near the boundary of the block is calculated, and the boundary is moved to a position where the absolute value of the difference is smallest.

In the above description, output signal strings a[1], ..., a[n], b[1], ..., b[n] of image sensor arrays A and B are used for focus state detection algorithms. However, when the image sensor array output contains high frequency components that are higher than the Nyquist frequency of the subject, focus state detection may not be conducted with precision when there is an unbalance in the outputs of array A and array B. Hence, a method is disclosed in Japanese Patent Publication No. 61-245123 wherein a filter algorithm process is enacted with respect to the output signal strings, and focus state detection algorithms are conducted using the filter process data.

For example, a filter algorithm process, which eliminates the high frequency components that are at least as high as the Nyquist frequency, is shown by formulae 12 and 13 hereafter, and with this it is possible to obtain from output signal strings a[1], ..., a[n], b[1], ..., b[n] of image sensor arrays A and B, high frequency omitted filter process data items Pa[1], ..., Pa[n-2], Pb[1], ..., Pb[n-2].

$$Pa[i]=(a[i]+2\times a[i+1]+a[i+2])/4 \quad (12)$$

$$Pb[i]=(b[i]+2\times b[i+1]+b[i+2])/4 \quad (13)$$

where i=1 to n-2.

When a filter algorithm process is enacted that eliminates the effects of unbalance in the outputs of array A and array B, for example using formula 14, on filter process data items Pa[1], ..., Pa[n-2], Pb[1], ..., Pb[n-2], it is possible to obtain DC-eliminated filter process data items Fa[1], ..., Fa[n-2-2s], Fb[1], ..., Fb[n-2-2s].

$$Fa[i]=-Pa[i]+2\times Pa[i+s]-Pa[i+2s] \quad (14)$$

$$Fb[i]=-Pb[i]+2\times Pb[i+s]-Pb[i+2s] \quad (15)$$

where i=1 to n-2-2s, s is an integer from 1 to 10, and the larger s is, the more the lower frequency components of the subject pattern are extracted, while the smaller s is, the more the high frequency components of the subject pattern are extracted.

In addition, the number of filter process data items diminishes the larger s is. Near the in-focus state, a relatively small value is desirable for s because the subject image contains a large number of high frequency components near the in-focus state, while in unfocussed states, large values are desirable for s because the subject image is blurry and contains only low frequency components. Because substantially all low frequency components are eliminated when s is small, detection is impossible when the defocus amount is large and there are no high frequency components. Accordingly, in this case there is no meaning in setting the maximum shift amount lmax very large in formula 1, so a relatively small value will do. Conversely, because detection is possible even with a large defocus amount when s is large because low frequency components are extracted, a relatively large value is set for lmax.

When s is relatively large, every other DC-eliminated filter process data item Fa[i] and Fb[i] obtained from formulae 14 and 15 can be removed, so that the number of data items is cut in half. By doing this, half the algorithm range will do in comparison with the uncut case despite having the same focus state detection area, because the width of two pixels is held in a single data item. In addition, because the shift amount in the cut case is double the shift amount in the uncut case, it is possible to detect a defocus amount of the same size even if the maximum shift number is cut in half.

FIGS. 18(a)–(c) are examples of a subject image having only low frequency components, with 18(a) being the output signal, 18(b) being the filter process data when s=2 and 18(c) being the filter process data when s=8. FIGS. 18(a)–(c) also show an in-focus state, that is to say, a state wherein the output signal string of array A and the output signal string of array B overlap. In this way, the s=2 filter process data items are flat, having substantially no contrast, while when s=8, the contrast is sufficient and a defocus amount with a high level of confidence is obtained.

In comparing the narrow algorithm range ce1 and the wide algorithm range ce2 in FIG. 18(c), the wide algorithm range ce2 can conduct more precise focus state detection because this range contains most of the contrast. That is to say, it is preferable to widen the algorithm range with filter process data items that extract low frequency components.

FIGS. 19(a)–c) illustrate the case where the subject image is composed only of high frequency components, with 19(a)–(c) being the same types of data as in FIGS. 18(a)–(c), and in an in-focus state. In this case, when s=2, contrast is sufficient, and a defocus amount with a high level of confidence can be obtained. In FIG. 19(b), comparing narrow algorithm range ce1 and wide algorithm range ce2 shows that the contrast contained in both is the same, but a narrower algorithm range will make it more difficult for effects of noise to be felt. That is to say, if the algorithm range is too wide, there will be cases wherein subjects of different distances will simultaneously be positioned within the algorithm range, and because focus state detection is impossible in this kind of situation, it is preferable to make the algorithm range relatively narrow with filter process data items that extract high frequency components.

FIGS. 20(a)–(c) illustrate a case where the subject has sufficient amounts of both high and low frequency components, with 19(a)–19(c) being the same types of data as in FIGS. 18(a)–(c) and in an in-focus state. With this pattern, sufficient contrast is obtained regardless of the value of s. In addition, the distribution range of the contrast of the pattern becomes larger as s becomes larger.

FIGS. 21(a)–(c) illustrate the case wherein the defocus amount is large, for example the output when viewing a subject such as a single chimney or the like. The data types in FIGS. 21(a)–(c) are the same as in FIGS. 18(a)–(c), and the solid line indicates the output signal string from array A while the dashed line indicates the output signal string from array B. In this way, when the defocus amount is large, contrast is not obtained with filter process data when s=2 because substantially no high frequency components are included. On the other hand, it is possible to obtain sufficient contrast with filter process data when s=8, so it is possible to determine the defocus amount with precision by setting the maximum shift number lmax to a sufficiently large value.

Because the frequency components contained in the subject vary, there is a method wherein s is first set to 2, filter process data, which extracts the high frequency components, is output, and the process is concluded if a defocus amount with a high level of confidence can be obtained by conducting the focus state detection algorithms of formulae 1 to 11 using this filter process data; while if a defocus amount with a high level of confidence cannot be obtained, s is set to 4, filter process data, which extracts low frequency components, is output and the focus state detection algorithms are conducted using formulae 1 to 11, and so forth with the value of s being increased and the filter process being switched until a defocus amount with a high level of confidence is obtained.

With this method, because the high frequency components are extracted initially, near an in-focus state of a normal subject, for example, in the case of the pattern including high frequency components shown in FIGS. 20(a)–(c), it is possible to obtain a defocus amount with a high level of confidence with the focus state detection algorithms using filter process data with s=2, and consequently, it is possible to conduct focus state detection with a short algorithm time. When the subject image is the face of a person or the like and has only low frequency components, for example in the case of the pattern shown in FIGS. 18(a)–(c), it is possible to obtain a defocus amount with a high level of confidence with focus state detection using filter process data that extracts low frequency components.

When the defocus amount is large such as in FIG. 21, it is preferable to compute the defocus amount by increasing the maximum shift number lmax using filter process data that extracts low frequency components and then conducting focus state detection algorithms. When this is done, it is possible to shorten the algorithm time near the in-focus state, it is possible to easily follow the subject when the subject is moving, and it is possible to focus even when the subject image includes only low frequency components, so that it becomes possible to detect even large defocus amounts.

The precision of defocus amounts obtained when the subject includes high frequency components is in general better than the precision of defocus amounts obtained when the subject includes only low frequency components, and consequently, by initially conducting focus state detection using filter process data that extracts high frequency components, it becomes possible to obtain defocus amounts with good precision.

With focus state detection conducted on blocks, a method is proposed in Japanese Laid-Open Patent Publication No. 6-82686, corresponding to U.S. Pat. No. 5,389,995, wherein s is initially set to 2, filter process data is output, which extracts high frequency components, focus state detection algorithms are conducted on each block using this filter process data, and the process is concluded if a block exists in which a defocus amount with a high level of confidence can be obtained; while when a defocus amount with a high level of confidence cannot be obtained, s is set to 4, filter process data is output, which extracts low frequency components, and focus state detection algorithms are conducted on each block using this filter process data, and so forth with the filter process being switched until a block exists in which a defocus amount with a high level of confidence can be obtained.

In above-described Japanese Laid-Open Patent Publication No. 2-135311, the absolute value of the difference of adjacent data items near the boundary of the block is computed, and the boundary position is moved so that the block boundary becomes the position where the absolute value of the difference is a minimum, but a process is proposed in Japanese Laid-Open Patent Publication No. 6-82686 wherein when filter process data that completely eliminates DC components is divided into a plurality of blocks, the absolute value of the difference between data near the block boundary and a predetermined value is computed, and the block boundary position is set on the basis of the absolute value of this difference.

The filter processes of formulae 14 and 15 are processes that completely eliminate the DC component, but when focus state detection algorithms are conducted using data from filter processes that completely eliminate the DC component, a problem arises that the possibility of a false focus is greater than when data is used in which the DC component remains. This problem will be described with reference to FIGS. 22(a)–(d)

FIGS. 22(a) and 22(b) are output signals from image sensor arrays A and B when a subject is viewed wherein the luminosity changes in steps moving from left to right across the focus state detection area. In these figures, the pattern in FIG. 22(a) and the pattern in FIG. 22(b) match by the portions indicated by the arrows overlapping, and consequently, it can be seen that the output of image sensor array A has been shifted to the left with respect to the output of array B. On the other hand, FIGS. 22(c) and 22(d) are the data patterns of FIGS. 22(a) and 22(b) where the data is from filter processes that completely eliminate the DC component. Because only the DC component differs between the data in FIGS. 22(a) and 22(b), the data is entirely the same when the DC component is completely eliminated. Hence, when focus state detection is conducted using these data, the determination is made that the subject is in focus because the pair of data items already relatively agree.

In this way, different patterns are changed in relatively similar directions by enacting filter processes that completely eliminate the DC component. This is particularly noticeable when the algorithm range is made narrower by conducting block division as described above.

Hence, a method is proposed in Japanese Laid-Open Patent Publication No. 6-82686 wherein filter algorithm processes (hereinafter called the DC reduction filter processes) are conducted that do not completely eliminate the DC component as shown in formulae 16 and 17, to obtain DC reduction filter process data Qa[i] and Qb[i].

$$Qa[i]=-Pa[i]+4\times Pa[i+y]-Pa[i+2y] \quad (16)$$

$$Qb[i]=-Pb[i]+4\times Pb[i+y]-Pb[i+2y] \quad (17)$$

where i=1 to n-2-2y.

In focus state detection devices that conduct block division and then conduct focus state detection algorithms for each block, a method of determining a single defocus amount finally from the plurality of defocus amounts, other than the above-described methods of selecting the defocus amount indicating the closest distance or selecting the defocus amount of the block where the information value E is largest, are proposed in Japanese Patent Publication Nos. 2-178641 and 2-235512 (corresponding to U.S. Pat. No. 5,258,801). The method noted in the disclosures of these publications selects a block satisfying predetermined conditions as a standard block, sets the defocus amount of the standard block as a standard defocus amount, conducts a weighing coefficient determination on the basis of the amount of difference between the various defocus amounts and the standard defocus amount, and determines a weighted average of the plurality of defocus amounts using this weighing coefficient to compute a new defocus amount. The conditions for a standard block include the block that indicates a defocus amount indicating the closest distance. For example, when the amount of difference is small, the weighing coefficient is increased, and when the amount of difference is large, the weighing coefficient is made smaller.

With this method, when a plurality of subjects of differing distances are intermixed, it is possible to obtain a defocus amount relating to each of the subjects in the former manner; and when the subject is flat, such as a wall or the like, it is possible to obtain a stable defocus amount because the whole is averaged. When h is the number of blocks, Dfk is the standard defocus amount, Df[j] is the defocus amount and E[j] is the information amount E of block j, the combined defocus amount Dfm and combined information amount Em can be obtained using formulae 18 and 19 below.

$$Dfm=\Sigma(Df[j]\times E[j]\times W[j])/\Sigma(E[j]\times W[j]) \quad (18)$$

$$Em=\Sigma(E[j]\times W[j]) \quad (19)$$

where j=1 to h.

Weighing coefficient W[j] is determined as shown in FIG. 25 from the difference between Dfk and Df[j] and has a value between 0 and 1. ML and UL are predetermined values, so that W[j] is 1 when the absolute value of the difference in the defocus amounts is not greater than ML, is 0 when UL is exceeded, and changes in a linear manner between ML and UL. Thus, Df[j] is not used in the combining algorithm when W[j] is 0. The combined defocus amount Dfm obtained in this way is the final defocus amount. It is preferable for the value of ML to be a value between 30 μm and 50 μm, and for the value of UL to be between 80 μm and 140 μm.

On the other hand, when the subject pattern is a periodically repeating pattern, output signals from image sensor arrays A and B are obtained like those shown in FIGS. 24(a) and 24(b), and the correlation amount C[L] has a repeating pattern like that shown in FIG. 24(c), so that a plurality of correlation amounts of minimum value exist. Consequently, there is a strong possibility that the smallest value corresponding to the in-focus position will be erroneously selected, so that the determination will erroneously be an in-focus condition despite being a defocus condition, resulting in cases where a false focus is created.

Hence, in Japanese Laid-Open Patent Publication No. 2-238415, corresponding to U.S. Pat. No. 5,202,718, the fact that the subject has a periodic pattern is determined on the basis of the number of minimum values for the correlation amount C[L], and a warning is created. In addition, in Japanese Laid-Open Patent Publication No. 6-94987, corresponding to U.S. Pat. No. 5,389,995, the fact that the subject has a periodic pattern is determined on the basis of the correlation amount of the shift amounts separated by a predetermined shift number from the shift amount that yields the correlation amount of minimum value, and on the basis of the correlation amount of the shift amounts near the shift amount separated by a predetermined shift number. Blocks in which the subject is determined to be periodic are considered to be blocks where focus state detection is impossible even if a defocus amount with a high level of confidence can be obtained.

A first problem that arises in this kind of focus state detection device will now be described. FIG. 29 shows one of the pair of output signal strings when a subject that includes high frequency components is intermixed in the background of a subject composed of low frequency components, such as a human face or the like, and in this figure, Ob1 is a human face and Ob2 is the background. In focus state detection that conducts block division as described above in this kind of case, filter process data is first output that extracts the high frequency components, focus state detection algorithms are conducted on each block using this filter process data, and the process is concluded if a block exists wherein a defocus amount with a high level of confidence can be obtained; and when a defocus amount with a high level of confidence cannot be obtained, filter process data is output that extracts low frequency components, focus state detection algorithms are conducted on each block using this filter process data, and so forth with the filter process being switched until a block exists where a defocus amount with a high level of confidence can be obtained. Because the human face is composed only of low frequency components, a defocus amount with a high level of confidence cannot be obtained in blocks corresponding to subject Ob1 in the first focus state detection algorithms using filter process data that extracts high frequency components. However, because the background contains high frequency components, a defocus amount with a high level of confidence can be obtained in blocks corresponding to subject Ob2. Accordingly, the algorithm process is concluded, and because only a defocus amount relating to the background is obtained, shooting lens 100 focusses on the background and not on the person.

A second problem occurs in the case where the subject is completely periodic, and in Japanese Laid-Open Patent Publication No. 6-94987, focus state detection is impossible in blocks where the subject is determined to be periodic, even if a defocus amount with a high level of confidence can be obtained. When this occurs, focus state detection is impossible with respect to a subject that is completely periodic, such as a building or the like where windows are lined up with a definite period.

A third problem is the combining process and the setting of the weighing coefficient on the basis of a standard block. When the information amount of the block that is the standard is not very numerous, the standard defocus amount itself is dispersed, and consequently, the weighing coefficient for each block becomes unstable, making it impossible to obtain a stable final defocus amount.

A fourth problem is a problem that occurs when data is used in which the DC component is not completely eliminated, such as DC reduction filter process data, and this problem will be described with reference to FIGS. 26(a)–(b). FIG. 26(a) is the DC reduction filter process data when the subject has a brightness that changes dramatically, and because of the in-focus condition, Qa[i] and Qb[i] overlap. In this state, a slight deficiency in balance is created in output signals a[i] and b[i] of image sensor 2, so that the data becomes like the DC reduction filter process data of FIG. 26(b). In this figure, the dashed line is Qb[i] and the solid line is Qa[i]. Accordingly, Qa[i] is data that has shifted to the right with respect to Qb[i], and because this shifted amount is computed in obtaining a defocus amount in the focus state detection algorithms, a defocus amount is computed that shows that this state is not an in-focus state. Even when the brightness changes dramatically such as in FIG. 27, if the data takes the shape of a mountain with a peak in the brightness distribution, even if the balance is off, little effect will be felt by taking the boundary to be the position of the peak in brightness, so that Qa[i] and Qb[i] are shifted in opposite directions and relatively cancel each other. However, when block division is conducted, there are cases where a problem arises in the pattern within the range of some out of the plurality of blocks, even when no problem arises for the sensor as a whole. For example, the brightness changes dramatically within the range of block 4 in FIG. 28, and because this is not a mountain-shaped pattern, the defocus amount computed for block 4 will have low precision, so there is a possibility that the final defocus amount will be unstable.

SUMMARY OF THE INVENTION

It is an object of the present invention to provide a focus state detection device wherein the defocus amount of each subject can be computed with good precision even when a subject composed of only low frequency components and a subject containing high frequency components are intermixed in the photo field.

In addition, it is another object of the present invention to provide a focus state detection device wherein focus state detection can be conducted even with respect to completely periodic subjects.

In addition, it is still another object of the present invention to provide a focus state detection device wherein the precision of focus state detection algorithms can be improved by taking into consideration the contrast in the subject image.

In addition, it is yet another object of the present invention to provide a focus state detection device wherein the precision of focus state detection algorithms can be improved by determining whether the subject is a difficult subject, and by making the conditions for conducting focus state detection more strict when the subject is a difficult subject.

The above and other objects of the invention are achieved by providing an improved focus state detection device. The focus state detection device includes a photoelectric conversion element array composed of a plurality of photoelectric conversion elements. The array outputs a string of signals in accordance with the light intensity distribution of a subject image. A focus state detection optical system guides the light rays from the subject that have passed through the shooting lens to the photoelectric conversion element array and composes a subject image on the photoelectric conversion element array. A filter processor has a plurality of filter algorithm processes that extract various frequency components from the string of signals output from the photoelectric conversion element array, conducts one of the plurality of filter algorithm processes on the string of signals, and outputs filter process data that is the result of the algorithm process. An algorithm range setting device divides filter process data that has been output into blocks that become the units of focus state detection algorithms. A focus state detection algorithm device calculates a defocus amount for each block on the basis of the filter process data and determines the level of confidence of the defocus amount that has been calculated. An algorithm completion determination device divides the string of signals output from the photoelectric conversion array into a plurality of regions with the blocks being the boundaries, and for each of this plurality of regions, the algorithm completion determination device determines that focus state detection is possible in the region when the level of confidence is determined to be high in at least one of the blocks contained in the region. When focus state detection is determined to be possible in all of the plurality of regions, the algorithm completion determination device halts the operation of the filter processor, the algorithm range setting device and the focus state detection algorithm device. A defocus amount combination device that, when it is determined by the algorithm completion determination device that focus state detection is possible in all of the plurality of regions, composes the defocus amounts calculated for each block and determines the final focus adjustment state of the shooting lens.

For example, consider the case wherein FIG. 29 is divided into three regions to the right, center and left. First, with focus state detection algorithms using filter process data that extracts high frequency components, detection is possible in the right region because of the presence of subject Ob2. Detection is impossible in the left and center regions because subject Ob1 is composed only of low frequency components, so focus state detection is again conducted in these regions using filter process data that extracts lower frequency components. Through this, it becomes possible to obtain defocus amounts relating to subject Ob1, detection becomes possible in the left and center regions, further operation of the filter processor, algorithm range setting device and focus state detection algorithm device are halted by the algorithm completion determination device, and the series of operations is concluded. In this way, it is possible to obtain defocus amounts for the various subjects even when a subject composed of only low frequency components and a subject containing high frequency components are intermixed.

The filter processor may conduct processes from filter algorithm processes that extract high frequency components to filter algorithm processes that extract low frequency components and may conduct the plurality of filter algorithm processes in descending order of frequency components that have been extracted.

In accordance with another aspect of the invention, there is provided a focus state detection device including a pair of photoelectric conversion element arrays, each composed of a plurality of photoelectric conversion elements, with each array outputting a string of signals in accordance with the light intensity distribution of the subject image. A focus state detection optical system guides the light rays from the subject that are incident on the shooting lens to the pair of photoelectric conversion element arrays, and composes subject images on the pair of photoelectric conversion element arrays. An algorithm range setting device divides the pair of signal strings output from the pair of photoelectric conversion element arrays into blocks that become the units of focus state detection algorithms. A focus state detection algorithm device causes for each block a relative shift between the pairs of signal strings, calculates a correlation amount for the pair of signal strings, and determines the level of confidence of the defocus amount that has been calculated for each block on the basis of the correlation amount. A periodic subject determination device determines for each block whether the pair of signal strings is a periodic pattern signal. The focus state detecting device also includes a standard block setting device that, when at least one block exists in which it is determined by the periodic subject determination device that the signals are not periodic pattern signals while the level of confidence of the defocus amount has been determined to be high, sets one of these such blocks as standard block, and when all blocks in which the level of confidence of the defocus amount has been determined to be high are determined by the periodic subject determination device to have periodic pattern signals, the periodic subject determination device sets as the standard block the block with the smallest defocus amount out of these blocks. A defocus amount combination device determines the final focus adjustment state of the shooting lens on the basis of the standard block that has been established.

Consequently, if the shooting lens is not defocussed by a very large amount, focus state detection is possible even with completely periodic subjects, and the photographer can conduct the focus state detection action with respect to a completely periodic subject after effecting focussing of the shooting lens with respect to a subject that is about the same distance away as the completely periodic subject. Alternatively, the photographer can conduct the focus state detection action with respect to a completely periodic subject after manually moving the shooting lens to roughly near the focussing position, so that focus state detection is possible with respect to a completely periodic subject. In addition, when a block exists wherein detection is possible but the block is not a periodic block, a periodic block is not set as the standard block, and the standard block is selected out of the blocks that are not periodic blocks where detection is possible, and hence, no false focus is created.

In this embodiment, a filter processor conducts filter algorithm processes with respect to the pair of signal strings output from the pair of photoelectric conversion element arrays and outputs filter process data composed of certain frequency signal components. In this instance, the algorithm range setting device divides the filter process data into blocks; the focus state detection algorithm device determines whether the level of confidence is high on the basis of the filter process data; and the periodic subject determination device determines whether the filter process data is a periodic pattern signal.

In accordance with another aspect of the invention, there is provided a focus state detection device including a photoelectric conversion element array composed of a plurality of photoelectric conversion elements. The array outputs a string of signals in accordance with the light intensity distribution of the subject image. A focus state detection optical system guides the light rays from the subject that have passed through the shooting lens to the photoelectric conversion element array and composes a subject image on the photoelectric conversion element array. An algorithm range setting device divides the signal string output from the photoelectric conversion element array into blocks that become the units of focus state detection algorithms. A focus state detection algorithm device calculates for each block a defocus amount and a value relating to the contrast in the subject image on the basis of the signal string and determines the level of confidence of the defocus amount on the basis of the value relating to the contrast. A standard block setting device sets as the standard block one out of the blocks in which the level of confidence has been determined to be high. A weighing coefficient setting device sets a weighing coefficient for the weighted average of the defocus amounts computed for each block on the basis of the value relating to the contrast in the standard block and the defocus amount of the standard block. A defocus amount combination device determines the weighted average of the defocus amounts on the basis of the weighing coefficient that has been set and determines the final focus adjustment state of the shooting lens on the basis of the weighted average of the defocus amounts.

In this embodiment, a filter processor conducts filter algorithm processes with respect to the pair of signal strings output from the pair of photoelectric conversion element arrays. The filter processor outputs filter process data composed of certain frequency signal components. The algorithm range setting device divides the filter process data into blocks, and the focus state detection algorithm device determines whether the level of confidence is high on the basis of the filter process data.

In accordance with still another aspect of the invention, there is provided a focus state detection device including a pair of photoelectric conversion element arrays, each composed of a plurality of photoelectric conversion elements. Each array outputs a string of signals in accordance with the light intensity distribution of the subject image. A focus state detection optical system guides the light rays from the subject that are incident on the shooting lens to the pair of photoelectric conversion element arrays and composes subject images on the pair of photoelectric conversion element arrays. An algorithm range setting device divides the pair of signal strings output from the pair of photoelectric conversion element arrays into blocks that become the units of focus state detection algorithms. A subject pattern determination device determines for each block whether the block is a difficult subject block indicating that focus state detection is difficult. The determination is made on the basis of at least one of the pair of signal strings. A threshold value setting device that, when it is determined by the subject pattern determination device that the block is a difficult subject block, sets the threshold value that is the criterion for determining the level of confidence of the defocus amount to a strict value in comparison to the case when it has been determined that the block is not a difficult subject block. A focus state detection algorithm that causes for each block a relative shift between the pairs of signal strings and calculates a correlation amount for the pair of shifted signal strings, computes the defocus amount for each block on the basis of the correlation amount, and determines the level of confidence of the defocus amount on the basis of the threshold value. Through this, when the subject is a difficult subject, there is no difficulty in determining whether focus state detection is possible, so the precision of the defocus amount does not deteriorate.

In this embodiment, a filter processor conducts filter algorithm processes with respect to the pair of signal strings output from the pair of photoelectric conversion element arrays and outputs filter process data in which the DC component has been diminished so that the DC component is not completely eliminated. The algorithm range setting device divides the filter process data into blocks, the subject pattern determination device determines whether a block is a difficult subject block on the basis of the filter process data, and the focus state detection algorithm device determines the level of confidence of the computed defocus amount on the basis of the filter process data.

In accordance with yet another aspect of the invention, there is provided a focus state detection device that includes a pair of photoelectric conversion element arrays, each composed of a plurality of photoelectric conversion elements. Each array outputs a string of signals in accordance with the light intensity distribution of the subject image. A focus state detection optical system guides the light rays from the subject that are incident on the shooting lens to the pair of photoelectric conversion element arrays and composes subject images on the pair of photoelectric conversion element arrays 2. An algorithm range setting device sets at least a portion of the pair of signal strings output from the pair of photoelectric conversion element arrays as a focus state detection algorithm region. A subject pattern determination device determines whether a focus state detection algorithm region is a difficult subject region indicating that focus state detection is difficult, the determination being made on the basis of at least one of the pair of signal strings. A threshold value setting device that, when it is determined by the subject pattern determination device that the region is a difficult subject region, sets the threshold value that is the criterion for determining the level of confidence of the defocus amount to a strict value in comparison to the case when it has been determined that the region is not a difficult subject region. A focus state detection algorithm device causes a relative shift between the pairs of signal strings, calculates a correlation amount for the pair of shifted signal strings, computes the defocus amount on the basis of the correlation amount, and determines the level of confidence of the defocus amount on the basis of the threshold value. Through this, when the region is a difficult subject region, there is no difficulty in determining whether focus state detection is possible, so the precision of the defocus amount does not deteriorate.

In this embodiment, a filter processor conducts filter algorithm processes with respect to the pair of signal strings output from the pair of photoelectric conversion element arrays and outputs filter process data in which the DC component has been diminished so that the DC component is not completely eliminated. The algorithm range setting device sets at least a portion of the filter process data as focus state detection algorithm regions. The subject pattern determination device determines whether a region is a difficult subject region on the basis of the filter process data. The focus state detection algorithm device determines whether the level of confidence is high on the basis of the filter process data.

BRIEF DESCRIPTION OF THE DRAWINGS

These and other aspects and advantages of the present invention will become apparent from the following detailed description of preferred embodiments when taken in conjunction with the accompanying drawings, in which:

FIGS. 22(a)-(d) show an example of a subject that creates a false focus with filter process data that completely eliminates the DC component;

DETAILED DESCRIPTION OF PREFERRED EMBODIMENTS

Figure 1:
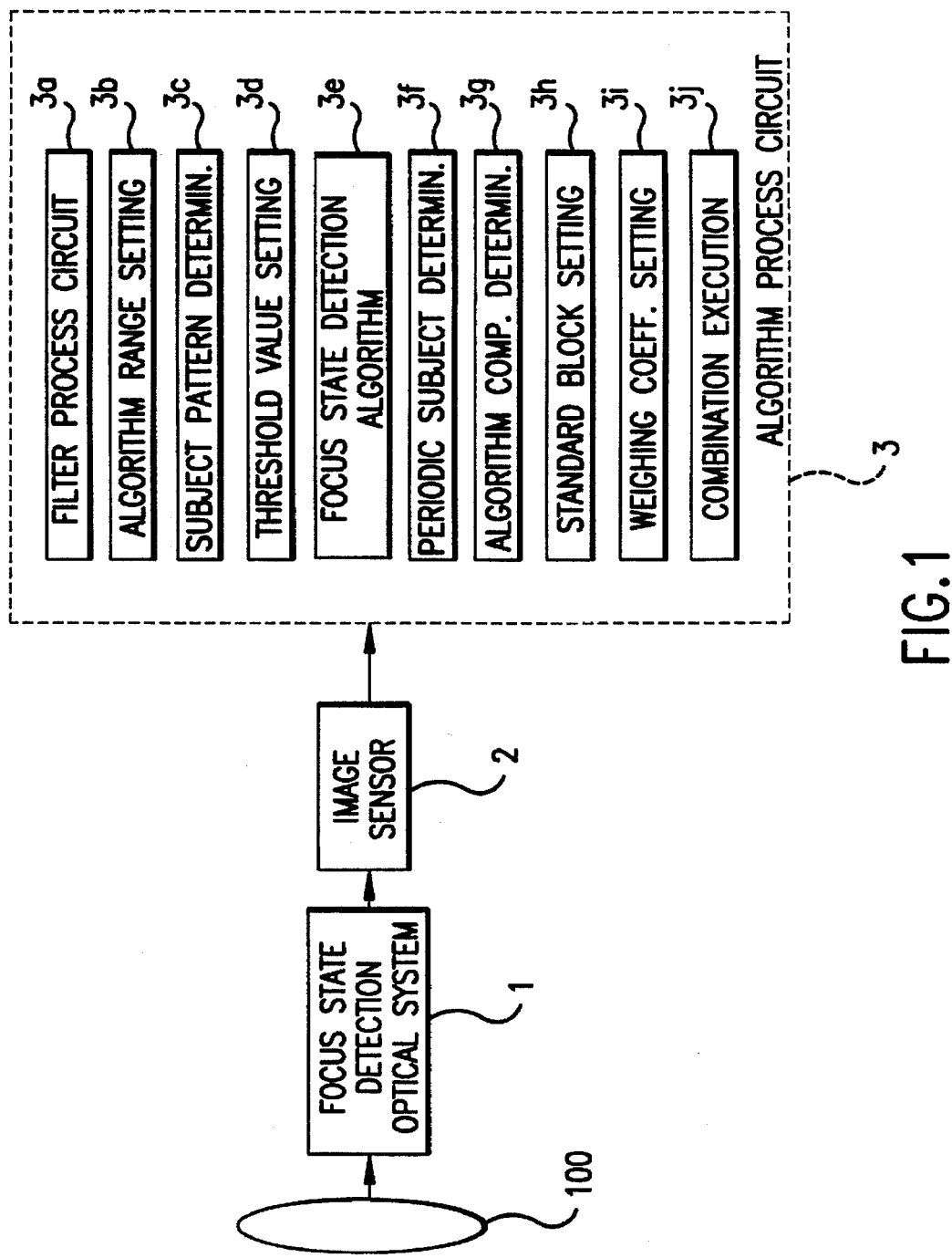
FIG. 1 is a block drawing showing the configuration of the present invention.
Figure 14:
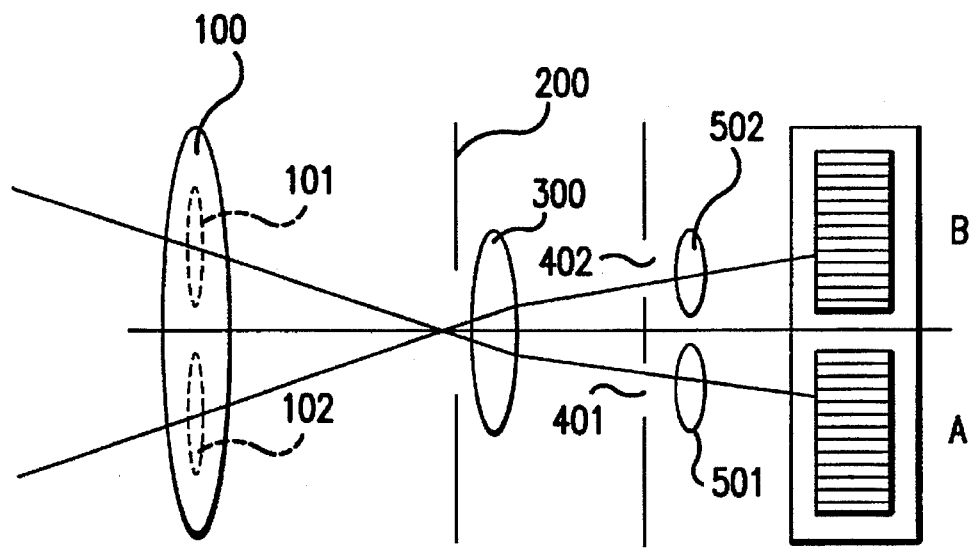
FIG. 14 is a drawing showing the focus state detection optical system in one type of conventional device.
Figure 15A:
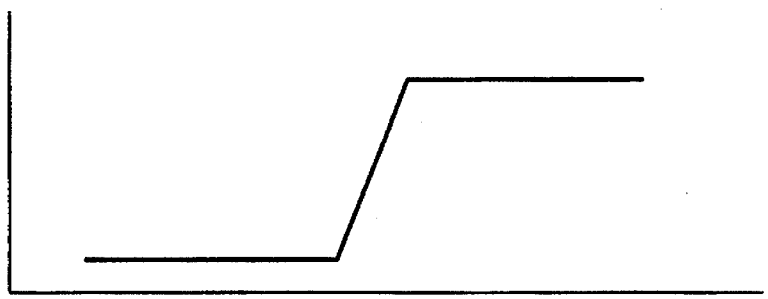
FIGS. 15(a)-(c) illustrate the focus state detection algorithm in one type of conventional device.
Figure 15B:
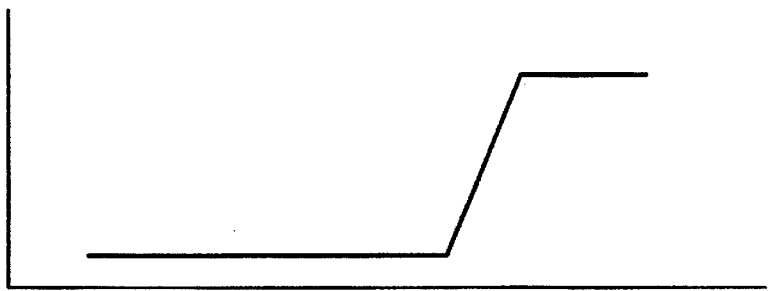
Figure 15C:
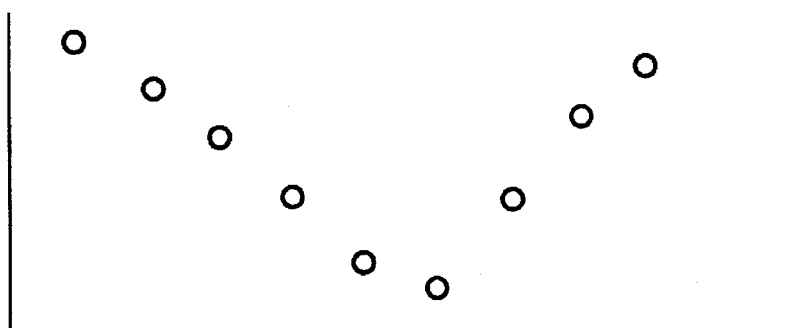
Figure 16:
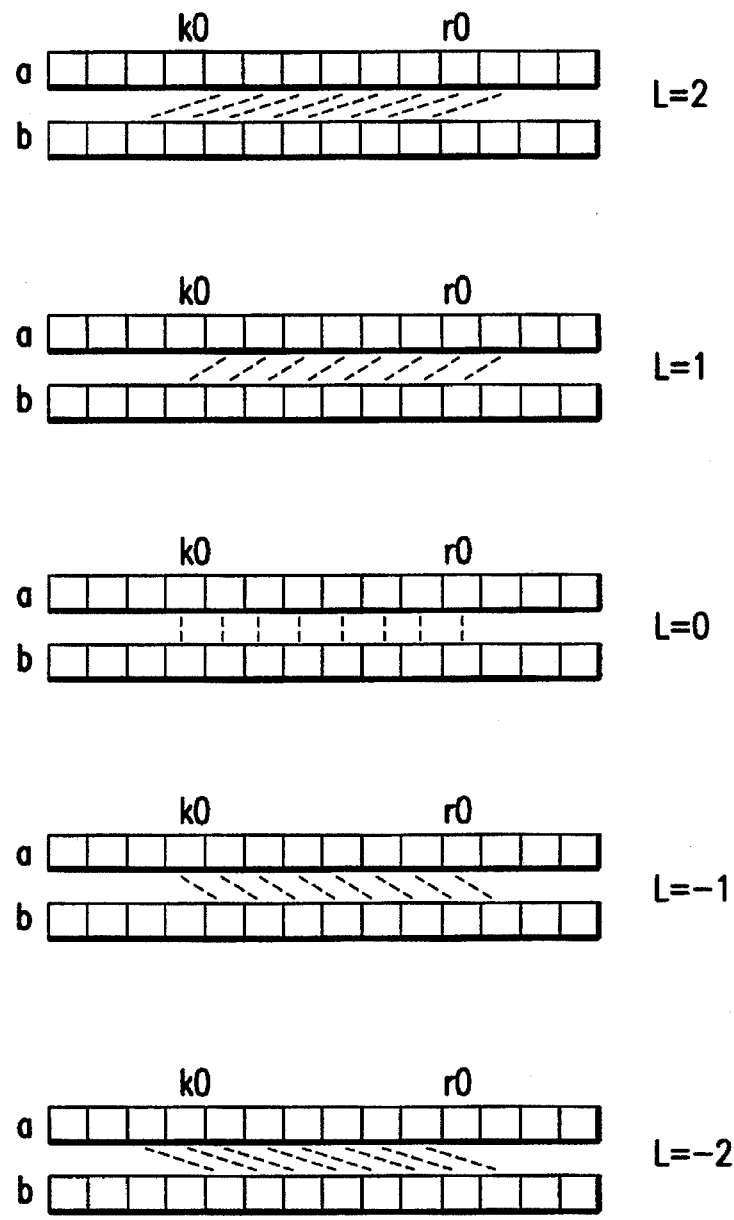
FIG. 16 is a drawing illustrating the correlation algorithm in one type of conventional device.
Figure 17:
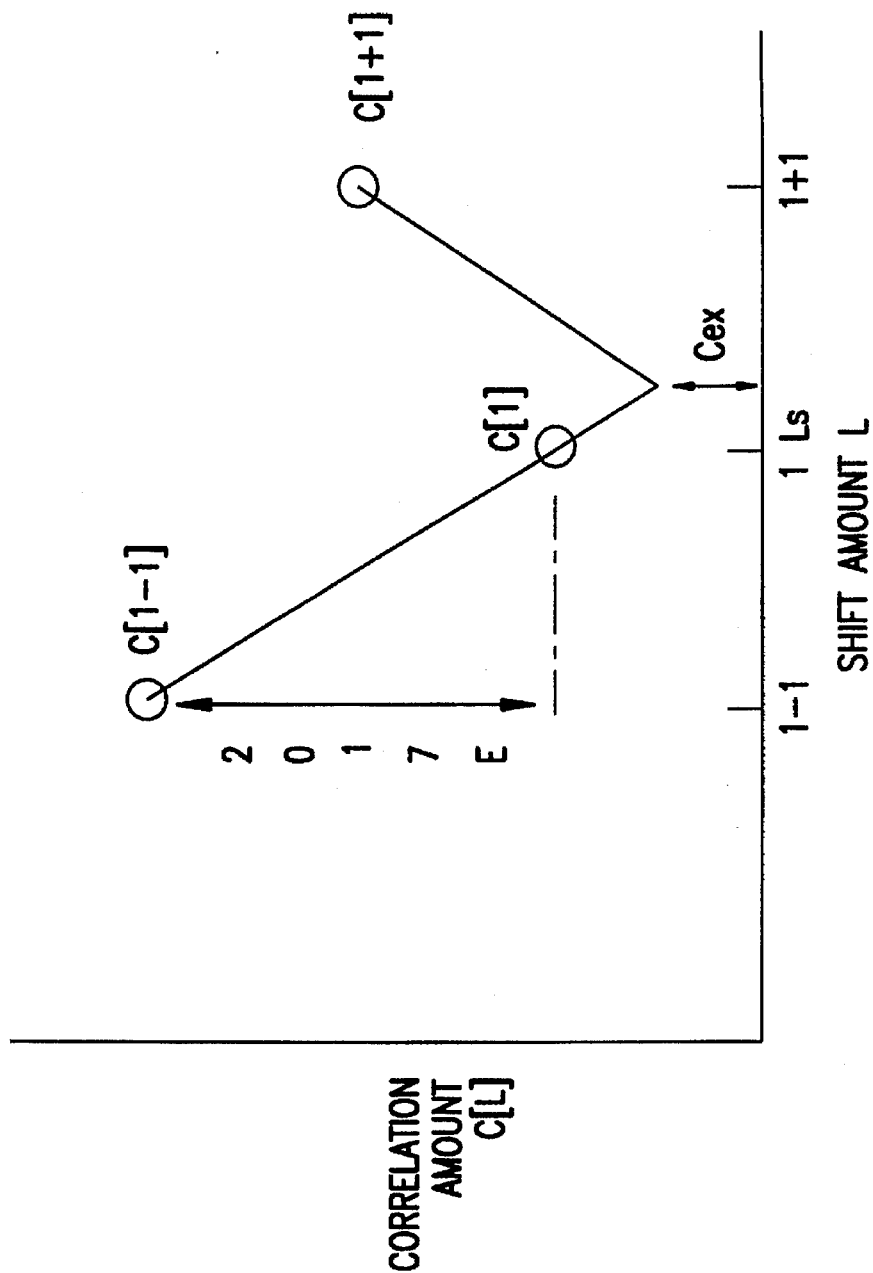
FIG. 17 is a drawing illustrating the focus state detection algorithm in one type of conventional device.
Figure 18A:
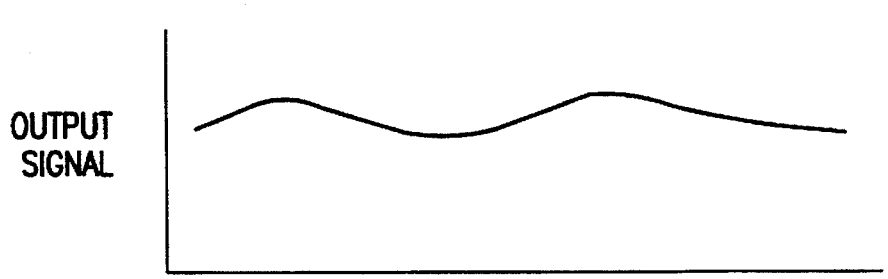
FIGS. 18(a)-(c) show an example of a pattern composed only of low frequency components.
Figure 18B:
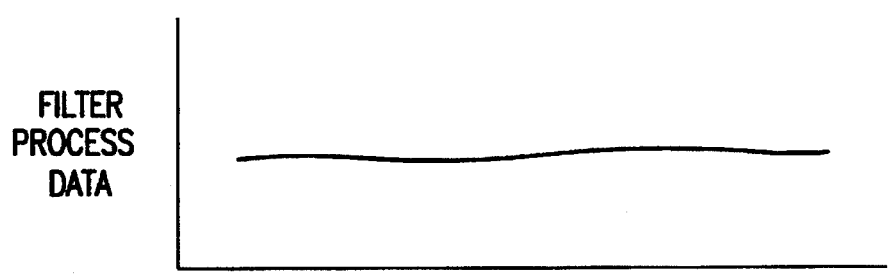
Figure 18C:
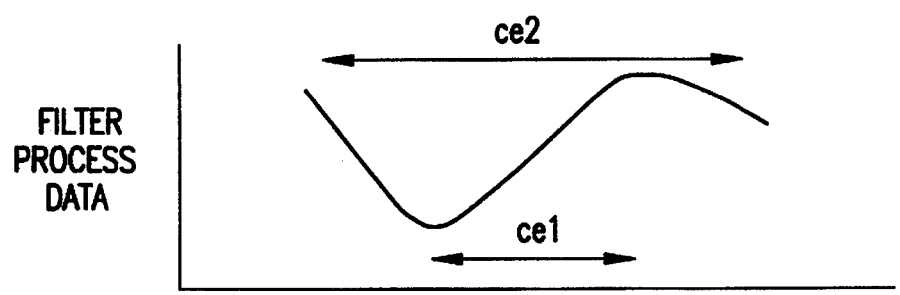
Figure 19A:
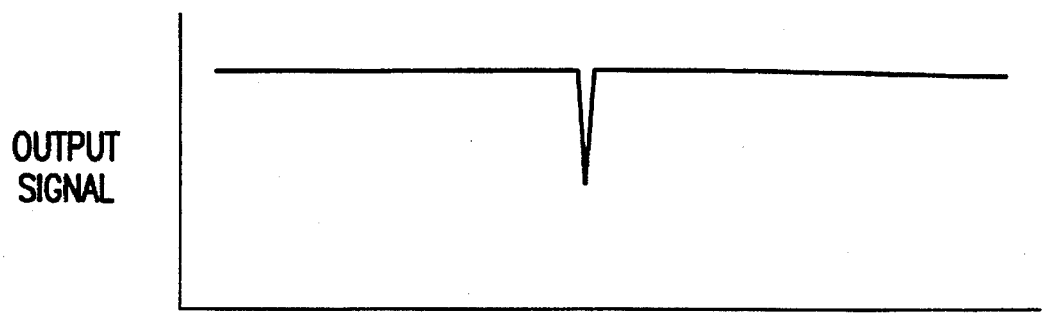
FIGS. 19(a)-(c) show an example of a pattern composed only of high frequency components.
Figure 19B:
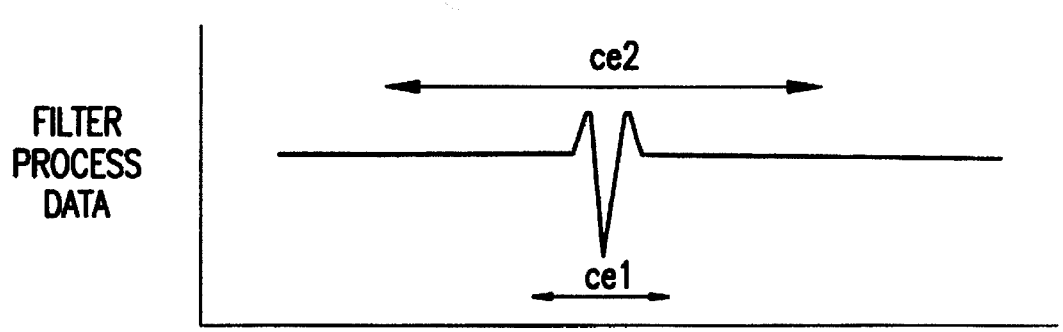
Figure 19C:
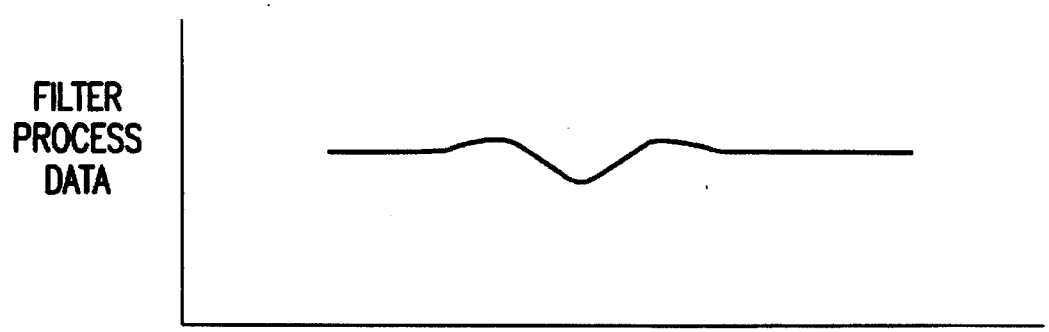
Figure 20A:
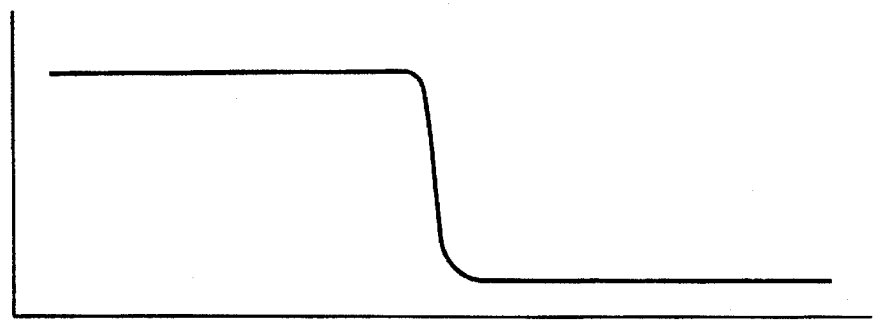
FIGS. 20(a)-(c) show an example of a pattern including both high frequency components and low frequency components.
Figure 20B:
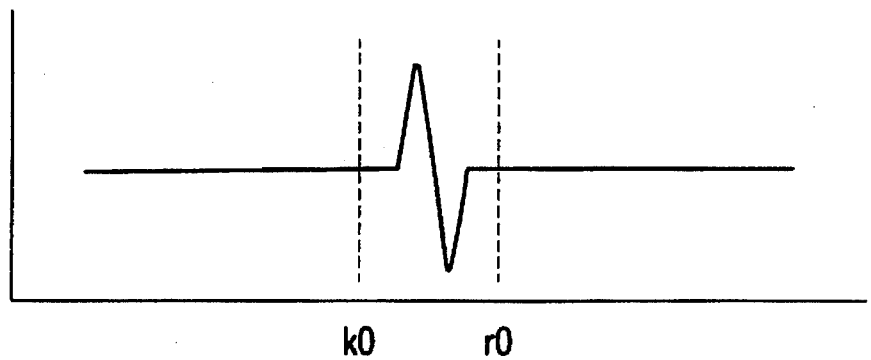
Figure 20C:
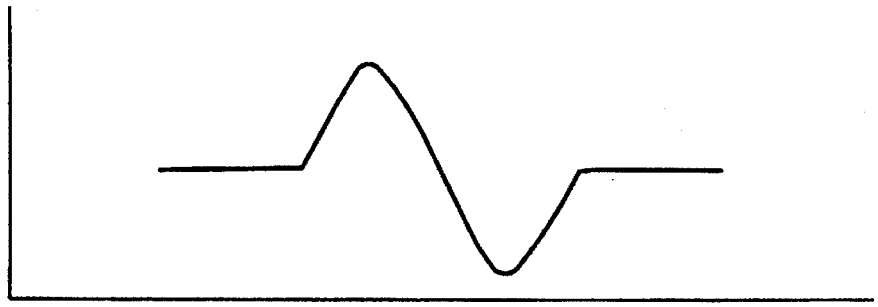
Figure 21A:
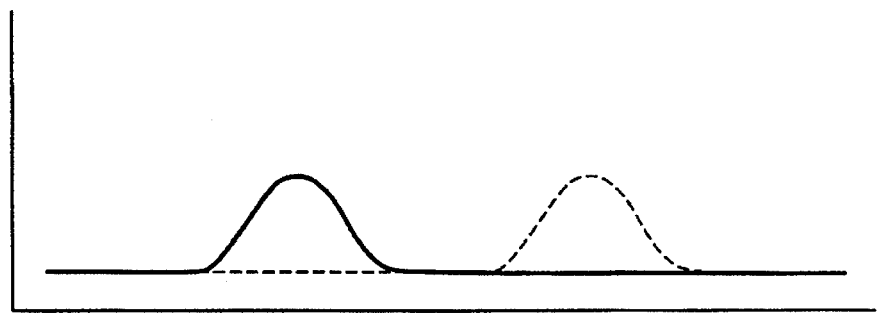
FIGS. 21(a)-(c) show a pattern when the defocus amount is large.
Figure 21B:
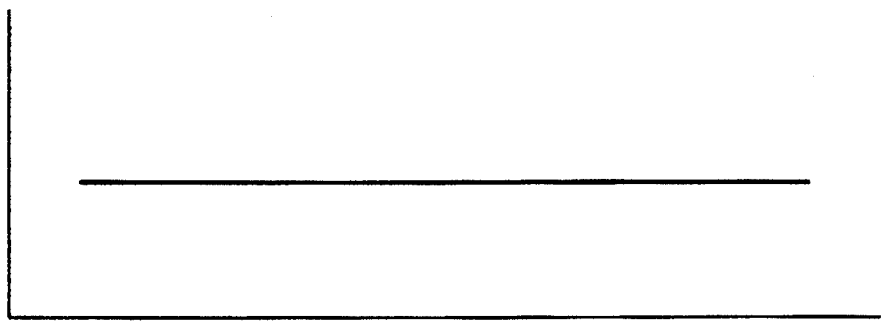
Figure 21C:
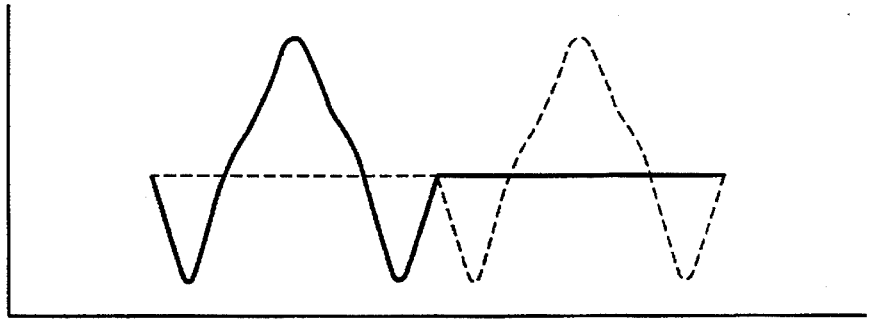
Figure 23A:
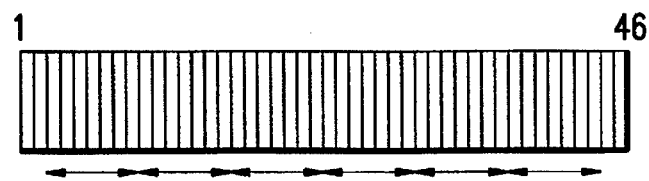
FIGS. 23(a)-(b) illustrate block division in one type of conventional device.
Figure 23B:
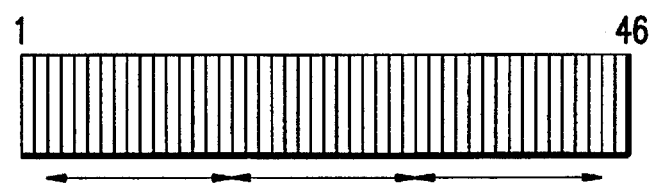
Figure 24A:
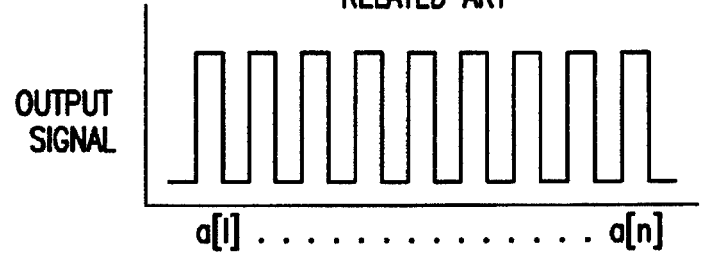
FIGS. 24(a)-(c) illustrate the state of the output signal and the correlation amount when the subject has a periodic pattern.
Figure 24B:
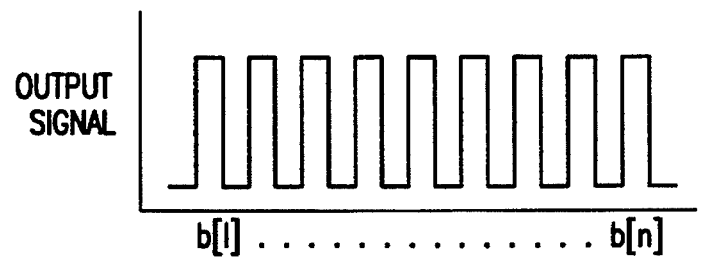
Figure 24C:
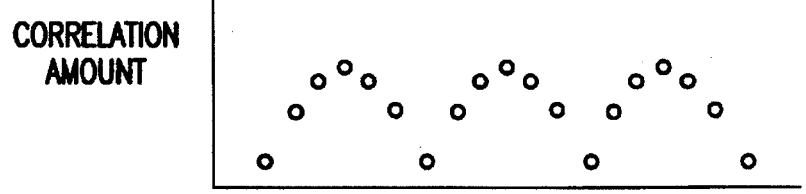

FIG. 1 is a drawing of the configuration of an embodiment of a focus state detection device according to the present invention. Reference number 1 in FIG. 1 designates a focus state detection optical system that guides light rays from the photographic subject, which have passed through shooting lens 100, to an image sensor 2. This system is comprised, for example, of field mask 200, field lens 300, aperture stops 401 and 402 and re-imaging lenses 501 and 502 in above-described FIG. 14.

The image sensor 2 includes a pair of image sensor arrays composed of a plurality of photoelectric conversion elements. The image sensor 2 of the present embodiment has a pair of image sensor arrays A and B composed of 52 photoelectric conversion elements. Output signal strings a[i] and b[i], each composed of 52 items of data, are output from image sensor arrays A and B.

Reference number 3 designates an algorithm process circuit, which includes filter process circuit 3a, algorithm range setting circuit 3b, subject pattern determination circuit 3c, threshold value setting circuit 3d, focus state detection algorithm circuit 3e, periodic subject determination circuit 3f, algorithm completion determination circuit 3g, standard block setting circuit 3h, weighing coefficient setting circuit 3i and combination execution circuit 3j.

Filter process circuit 3a executes filter processes using formulae 12 to 17 with respect to output signal strings a[i] and b[i] output from image sensor 2 and outputs DC-eliminated filter process data Fa[i] and Fb[i] and DC reduction filter process data Qa[i] and Qb[i].

Because output signal strings a[i] and b[i] are each composed of 52 items of data, 50 items of high frequency component extracted filter process data Pa[i] and Pb[i] result when the algorithms in formulae 12 and 13 are conducted. The DC-eliminated filter algorithm processes using formulae 14 and 15 are of three types, with s=2, 4, and 8. Hereafter, the DC-eliminated filter algorithm processes when s=2, 4 and 8 will be called, respectively, the first filter algorithm process, the second filter algorithm process and the third filter algorithm process, and the filter process data obtained using each of these filter algorithm processes will be called first filter process data F1a[i] and F1b[i], second filter process data F2a[i] and F2b[i], and third filter process data F3a[i] and F3b[i].

The number of data items in the first filter process data F1a[i] and F1b[i] is 46 each, the number of data items in the second filter process data F2a[i] and F2b[i] is 42 each, and the number of data items in the third filter process data F3a[i] and F3b[i] is 34 each. Only 1 type of DC reduction filter algorithm process, with y=2, is prepared using formulae 16 and 17, and 46 items of each of DC reduction filter process data Qa[i] and Qb[i] are output.

Figure 12A:
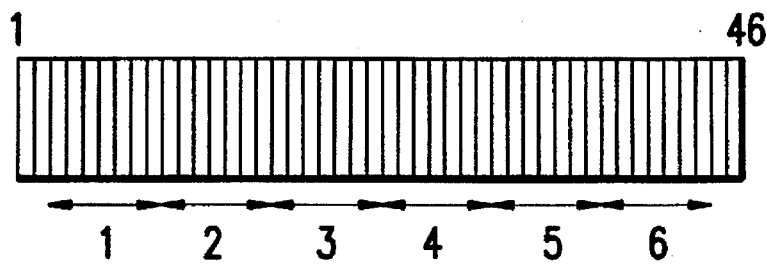
FIGS. 12(a)-(d) illustrate the state of algorithm range settings in the present invention.

Algorithm range setting circuit 3b shown in FIG. 1 determines the algorithm range by determining the first and last terms in accordance with the types of filter algorithm processes. With DC reduction filter process data, the data is divided into 6 blocks numbered block 1 to block 6 as shown in FIG. 12(a), and the standard first term kb[j] and standard last term rb[j] are set for each block according to formulae 20 to 25.

Block 1 kb[1]=3, rb[1]=9 (20)

Block 2 kb[2]=10, rb[2]=16 (21)

Block 3 kb[3]=17, rb[3]=23 (22)

Block 4 kb[4]=24, rb[4]=30 (23)

Block 5 kb[5]=31, rb[5]=37 (24)

Block 6 kb[6]=38, rb[6]=44 (25)

Initial terms k0[1], ..., k0[6] and last terms r0[1], ..., r0[6] are set so that, to the extent possible, the portions containing contrast and the boundary positions of the blocks do not overlap, the setting being made on the basis of the pattern of the DC reduction filter process data and the standard first terms kb[j] and standard last terms rb[j]. The setting method is the same as that of Japanese Laid-Open Patent Publication No. 2-135311, with the absolute value of the difference between data adjacent to the data near rb[j] and kb[j+1] computed near the block boundaries, with the boundaries of the block being those portions where the absolute value of the difference is a minimum. A detailed description of this is omitted here.

Figure 12B:
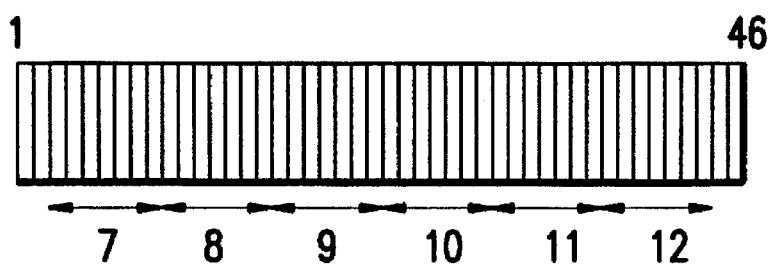

With the first filter process data, the data is divided into six blocks numbered block 7 through block 12 as shown in FIG. 12(b), and the standard first term kb[j] and standard last term rb[j] are set for each block according to formulae 26 to 31.

Block 7 kb[7]=3, rb[7]=9 (26)

Block 8 kb[8]=10, rb[8]=16 (27)

Block 9 kb[9]=17, rb[9]=23 (28)

Block 10 kb[10]=24, rb[10]=30 (29)

Block 11 kb[11]=31, rb[11]=37 (30)

Block 12 kb[12]=38, rb[12]=44 (31)

As disclosed in Japanese Laid-Open Patent Publication No. 6-82686, the absolute value of the difference between a predetermined value and the data near the block boundary, that is to say data near rb[j] and kb[j+1], is computed, and initial terms k0[7], ..., k0[12] and last terms r0[7], ..., r0[12] are set on the basis of the absolute value of this difference. A detailed description of this is omitted here.

Figure 12C:
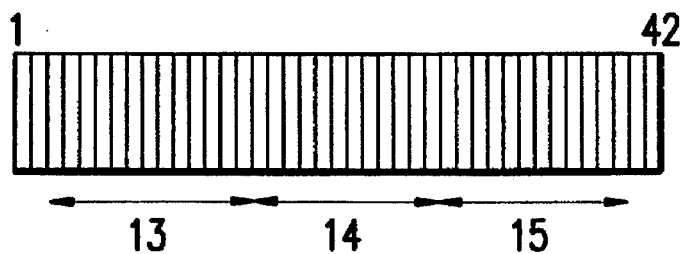

With the second filter process data, the data is divided into three blocks numbered block 13 through block 15 as shown in FIG. 12(c), and the standard first term kb[j] and standard last term rb[j] are set for each block according to formulae 32 to 34.

Block 13 kb[13]=3, rb[13]=15 (32)

Block 14 kb[14]=16, rb[14]=27 (33)

Block 15 kb[15]=28, rb[15]=40 (34)

Initial terms k0[13], k0[14], and k0[15] and last terms r0[13], r0[14], and r0[15] are set the same as the first filter process data on the basis of the second filter process data pattern and the standard initial terms kb[j] and standard last terms rb[j].

Figure 12D:
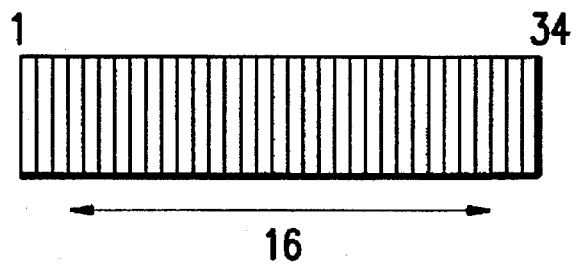
Figure 13:
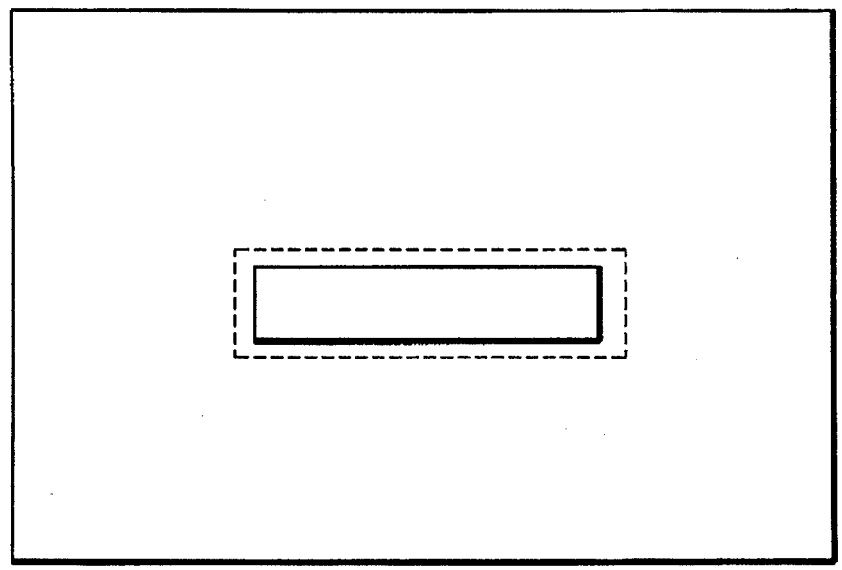
FIG. 13 is a drawing showing the positional relationship between the photo field and the focus state detection area in one type of conventional device.

With the third filter process data, one block 16 is set as shown in FIG. 12(d), with the algorithm range set according to formula 35 below.

Block 16 kb[16]=4, rb[16]=31 (35)

With the third filter process data, block boundary position setting is not conducted on the basis of the pattern.

Subject pattern determination circuit 3c shown in FIG. 1 computes the absolute value of the difference between adjacent data items, the contrast, and the difference between the maximum value and the minimum value (called the peak-to-peak value) for each block; and on the basis of these algorithm values it is determined whether the subject pattern within the block is one where focus state detection is using one of out of the pair of DC reduction filter process data Qa[i] and Qb[i] (herein, the assumption is that Qa[i] is used). The action of this subject pattern determination will be described with reference to FIG. 11.

Figure 11:
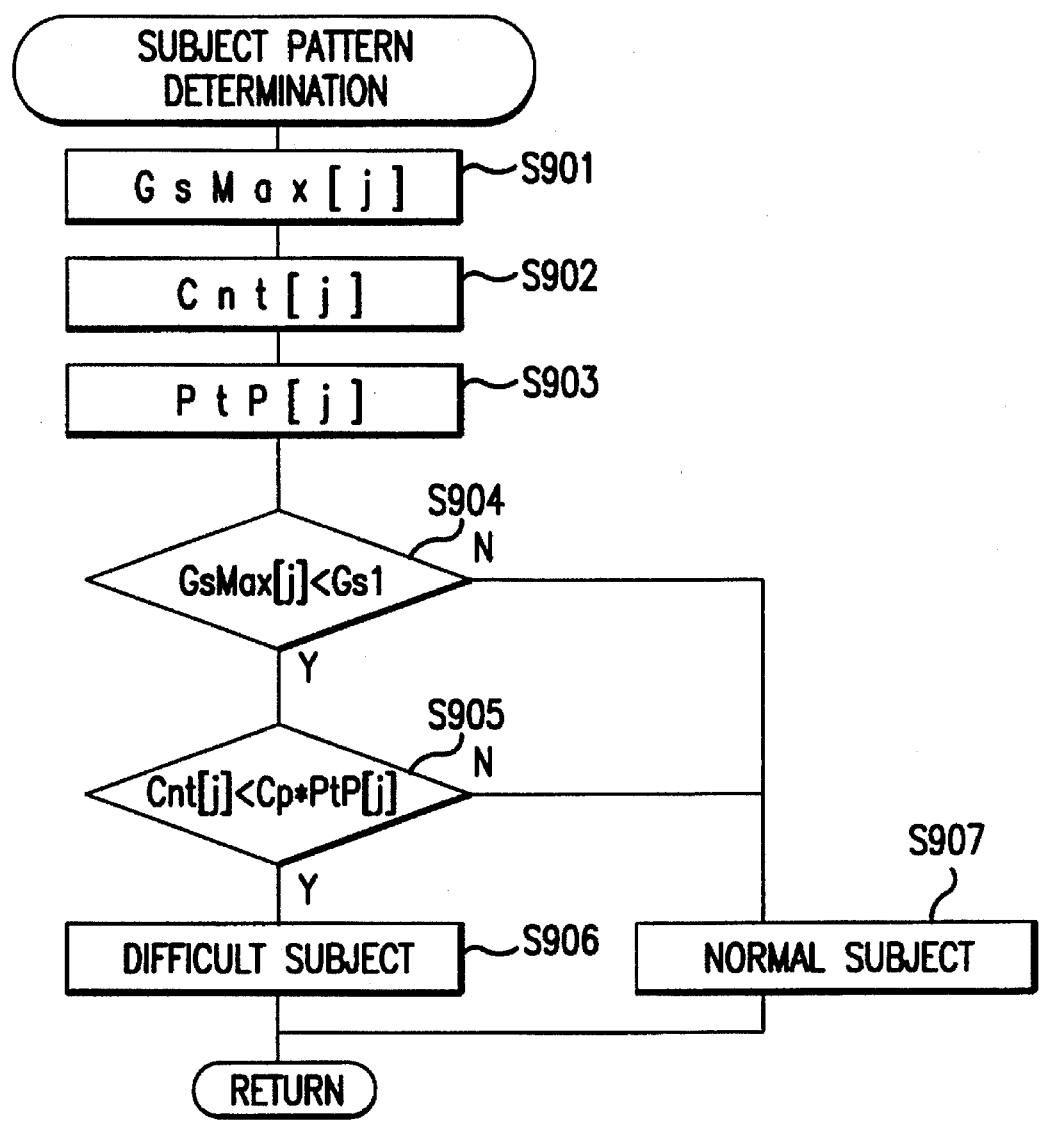
FIG. 11 is a flowchart showing the subject pattern determination circuit in the present invention.

In step S901 of FIG. 11, the absolute value of the difference between adjacent data items is computed for each block on the basis of formula 36, and the maximum value GsMax[j] is detected out of the computed values. Here, the j in formula 36 is a variable that designates each block.

$$GsMax[j]=Max\{|Qa[i]-Qa[i+t]|\} \quad (36)$$

Here, i=k0[j] to r0[j]−t, where the value of t is preferably an integer from 1 to 4.

In step S902, the contrast Cnt[j] is computed using formula 37.

$$Cnt[j]=\Sigma|Qa[i]-Qa[i+t]| \quad (37)$$

Here, i=k0[j] to r0[j]−t, where the value of t is preferably an integer from 1 to 4. However, t need not be the same as in formula 36.

In step S903, the peak-to-peak values PtP[j] are computed using formula 38.

$$PtP[j]=Max\{Qa[i]\}-Min\{Qa[i]\} \quad (38)$$

where i=k0[j] to r0[j].

In step S904, the determination is made as to whether the maximum value GsMax[j] satisfies the condition indicated in formula 39, and when this condition is satisfied, the process moves to step S905, while when this condition is not satisfied, the algorithm process circuit moves to step S907.

$$GsMax[j]<Gs1 \quad (39)$$

where Gs1 is a predetermined constant, preferably a value between ⅓ and ½ the value of threshold value E1.

In step S905, the determination is made as to whether the contrast Cnt[j] and the peak-to-peak value PtP[j] satisfy the condition indicated by formula 40, and when this condition is satisfied, the algorithm process circuit moves to step S906, while when this condition is not satisfied, the algorithm process circuit moves to step S907.

$$Cnt[j]<Cp\times PtP[j] \quad (40)$$

where Cp is a predetermined coefficient, preferably a value between 1 and 2.

In step S906, it is determined that the jth block (hereafter called block j) is a block where focus state detection is difficult (hereafter called a difficult subject), and the operation is then concluded.

In step S907, the determination is that block j is not a difficult subject but is a normal subject, and the operation is then concluded.

Figure 28:
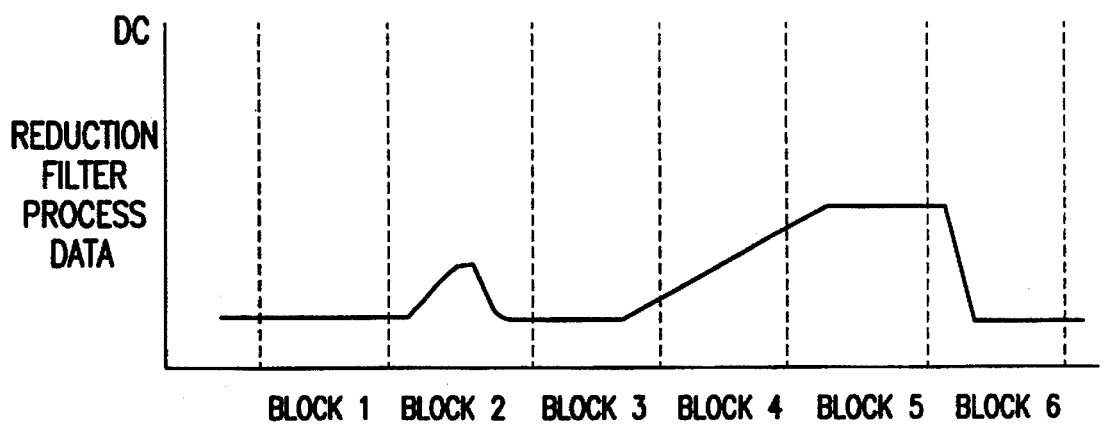
FIG. 28 is a drawing illustrating the case where a portion of the block is a difficult subject pattern when filter process data that does not completely eliminate the DC component is divided into blocks.
Figure 29:
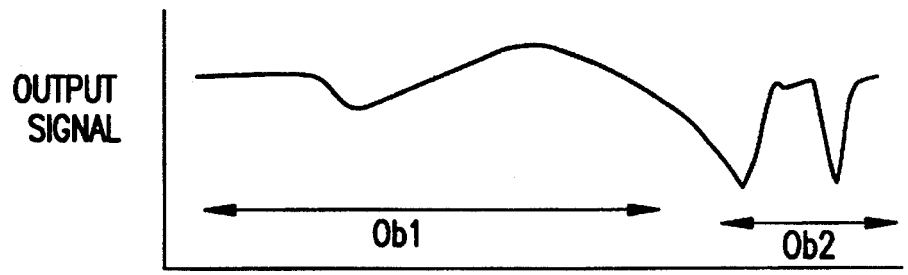
FIG. 29 is a drawing illustrating the case where a subject composed only of low frequency components and a subject that includes high frequency components are intermixed.

Through these kinds of operations, for example in block 2 in FIG. 28, the value of GsMax is made smaller because the slope is gentle, so the condition in formula 39 is satisfied.

However, because the pattern is in the shape of a mountain, Cnt[j] is around twice the value of Ptp[j], so formula 40 is not satisfied and the block does not become a difficult subject block.

On the other hand, block 6 has a monotonically decreasing pattern, so Cnt[j] and PtP[j] are substantially the same, and hence, the condition in formula 40 is satisfied. However, because the pattern is one in which the data changes abruptly, the value of GsMax[j] is large, so formula 39 is not satisfied, and the block does not become a difficult subject block.

In addition, block 4 has no abrupt changes and is a monotonically increasing pattern. Consequently, block 4 is determined to be a difficult subject block. Blocks that are determined to be difficult subjects have the threshold value E1 in below-described threshold value setting circuit $3d$ set more strictly in comparison to when the block is not a difficult subject block.

Threshold value setting circuit $3d$ shown in FIG. 1 sets threshold values E1, E2, G1 and G2 used in the determinations shown in formula 11 and below-described formula 52. These values vary depending on the type of filter algorithm process, and there are also cases where the values vary depending on the block with DC reduction filter process data. Hereafter, the operation of threshold value setting circuit is described with reference to FIG. 7.

In step S501, the determination is made as to whether the filter process data on which algorithm processes are conducted is DC reduction filter process data, and when the data is DC reduction filter process data, the algorithm process circuit moves to step S502, while when the data is some other filter process data, the algorithm process circuit moves to step S505.

In step S502, the threshold values are set on the basis of formula 41.

$$E1=Ea1, E2=Ea2, G1=Ga1, G2=Ga2 \qquad (41)$$

In step S503, the determination is made as to whether the object block is a difficult subject block. This determination is made using the results of determinations of above-described subject pattern determination circuit $3c$. When the block is a difficult subject block, the algorithm process circuit moves to step S504, while when the block is determined to be a normal subject block and not a difficult subject block, the operation is concluded.

In step S504, when the block has been determined to be a difficult subject block, threshold value E1 is made to be a more strict value, that is, the value is increased, as in formula 41, and the operation is then concluded.

$$E1=Tf \times E1 \qquad (42)$$

where Tf is a real number greater than 1.

In step S505, the determination is made as to whether the filter process data for which the algorithm process is conducted is first filter process data, and when this data is first filter process data, the algorithm process circuit moves to step S506, while when the data is some other filter process data, the algorithm process circuit moves to step S507.

In step S506, the threshold values are set according to formula 43, and the operation is then concluded.

$$E1=Eb1, E2=Eb2, G1=Gb1, G2=Gb2 \qquad (43)$$

In step S507, the determination is made as to whether the filter process data for which the algorithm process is conducted is second filter process data, and when this data is second filter process data, the process moves to step S508, while when this is not second filter process data, the determination is that the data is third filter process data, and the process moves to step S509.

In step S508, the threshold values are set according to formula 44, and the operation is then concluded.

$$E1=Ec1, E2=Ec2, G1=Gc1, G2=Gc2 \qquad (44)$$

In step S509, the threshold values are set according to formula 45, and the operation is then concluded.

$$E1=Ed1, E2=Ed2, G1=Gd1, G2=Gd2 \qquad (45)$$

In this way, the threshold values that are set satisfy the relationships in formulae 46 to 51.

$$Ea1>Ea2, Eb1>Eb2, Ec1>Ec2, Ed1>Ed2 \qquad (46)$$

$$Ga1 \leq Ga2, Gb1 \leq Gb2, Gc1 \leq Gc2, Gd1 \leq Gd2 \qquad (47)$$

$$Ea1 \leq Eb1 \leq Ec1 \leq Ed1 \qquad (48)$$

$$Ea2 \leq Eb2 \leq Ec2 \leq Ed2 \qquad (49)$$

$$Ga1 \geq Gb1 \geq Gc1 \geq Gd1 \qquad (50)$$

$$Ga2 \geq Gb2 \geq Gc2 \geq Gd2 \qquad (51)$$

In step S504, threshold value E1 is set strictly using formula 42 in the case of a difficult subject, but when Tf in formula 42 is an extremely large value, substantially all cases where the condition in formula 11 is satisfied disappear in the case of a difficult subject. Accordingly, in practice the effect is the same as nullifying the focus state detection algorithms in the case of a difficult subject. However, even with a difficult subject it is possible to obtain an accurate defocus amount when the information amount is numerous, and consequently, it is preferable for the value of Tf to be between 1.5 and 4.

Focus state detection algorithm circuit $3e$ shown in FIG. 1 computes a defocus amount Df[j], information amount E[j] and true smallest value Cex[j] for each block using DC reduction filter process data Qa[i] and Qb[i] and DC-eliminated filter process data Fa[i] and Fb[i]. The circuit $3e$ conducts a level of confidence determination for the defocus amounts computed for each block using E[j] and Cex[j]. Hereafter, the operation of the focus state detection algorithm circuit is described with reference to FIG. 8.

In step S601, correlation amounts C[L] are computed using formulae 1 to 5. In step S602, the defocus amounts Df[j], information amounts E[j] and true smallest values Cex[j] are computed using formulae 6 to 10. In step S603, a determination is conducted using formula 11, and when this condition is not satisfied, the process moves to step S605, while when the condition is satisfied the process moves to step S604. In step S604, the determination is made that focus state detection is possible in blocks where the determination of formula 11 is satisfied (hereafter called "detection-possible blocks"), and the operation is then concluded.

In step S605, a determination is conducted using formula 52.

$$E[j]>E2 \text{ and } Cex[j]/E[j]<G2 \qquad (52)$$

As indicated by formulae 46 and 47, because E1 is more strict (larger) than E2, and G1 is more strict (smaller) than or equal to G2, the determination of formula 52 is more lenient than the determination of formula 11. When formula 52 is satisfied, the process moves to step S606, while when this formula is not satisfied, the process moves to step S607.

In step S606, it is not clear whether focus state detection is possible because formula 52 is satisfied while formula 11 is not satisfied, so consequently, the determination is made that this block is a "quasi detection-possible block," and the operation is then concluded.

In step S607, the determination is that the block is a block in which focus state detection is not possible (hereafter called a detection-impossible block), and the operation is then concluded.

Periodic subject determination circuit 3f shown in FIG. 1 makes a determination as to whether the pattern of a block that has been determined to be a detection-possible block is a periodic pattern. The method of determination based on the number of smallest values of correlation amount C[L] such as in Japanese Laid-Open Patent Publication No. 2-238415, or is based on (1) the correlation amount at a shift amount separated by a predetermined shift number from the shift amount that yields the correlation amount that is the smallest value and (2) the correlation amount at a shift amount near the shift amount separated by a predetermined shift number, as in Japanese Laid-Open Patent Publication No. 6-94987. Details of this method of determination are omitted here. Hereafter, a block that is determined to have a periodic pattern is called a periodic block.

Algorithm completion determination circuit 3g shown in FIG. 1 makes a determination as to whether the algorithm process is concluded on the basis of the algorithm results from focus state detection algorithm circuit 3e, or whether the algorithm process is to be continued after switching filter process data. The focus state detection area is divided into three regions, namely a left region, a center region and a right region (hereafter Lf, Cf and Rf, respectively), and the filter process data is switched and the algorithm process is continued until a detection-possible block is obtained in each region. The blocks that belong to each of the regions Lf, Cf and Rf are as shown hereafter.

Lf Block 1, 2 (DC reduction filter process data)
block 7, 8 (first filter process data)
block 13 (second filter process data)
block 16 (third filter process data)
Cf block 3, 4 (DC reduction filter process data)
block 9, 10 (first filter process data)
block 14 (second filter process data)
block 16 (third filter process data)
Rf block 5, 6 (DC reduction filter process data)
block 11, 12 (first filter process data)
block 15 (second filter process data)
block 16 (third filter process data)

When one of the blocks belonging to each region becomes a detection-possible block, the determination is made that the region is detection-possible. The switching of filter process data is made in the order of DC reduction filter process data, first filter process data, second filter process data and third filter process data, as described hereafter. Furthermore, if all of Lf, Cf and RF become detection-possible for any of the filter process data, the algorithm process is concluded without switching to the next filter process data in the listed order.

Standard block determination circuit 3h shown in FIG. 1 selects one out of the detection-possible blocks as a standard block and sets the defocus amount of the standard block to be the standard defocus amount Dfk and sets the information amount of this block to be the standard information amount Ek. Selecting the standard block will be described with reference to FIG. 9.

In steps S701 and S702, the determination is made as to whether a detection-possible block exists that is not a periodic block. The process moves to step S703 when a detection-possible block exists that is not a periodic block, while the process moves to step S704 when all detection-possible blocks are periodic blocks.

In step S703, the block indicating the closest defocus amount is selected as the standard block out of the detection-possible blocks that are not periodic blocks, the defocus amount of the standard block is set as the standard defocus amount Dfk and the information amount of the standard block is set as the standard information amount Ek, following which the operation is concluded.

In step S704, the block in which the absolute value of the defocus amount is a minimum is selected as the standard block out of the detection-possible blocks, the defocus amount of the standard block is set as the standard defocus amount Dfk and the information amount of the standard block is set as the standard information amount Ek, following which the operation is concluded. The absolute value of the defocus amount being a minimum means the defocus amount that is closest to the in-focus state of shooting lens 100 at that time. A quasi detection-possible block cannot become the standard block.

Figure 10:
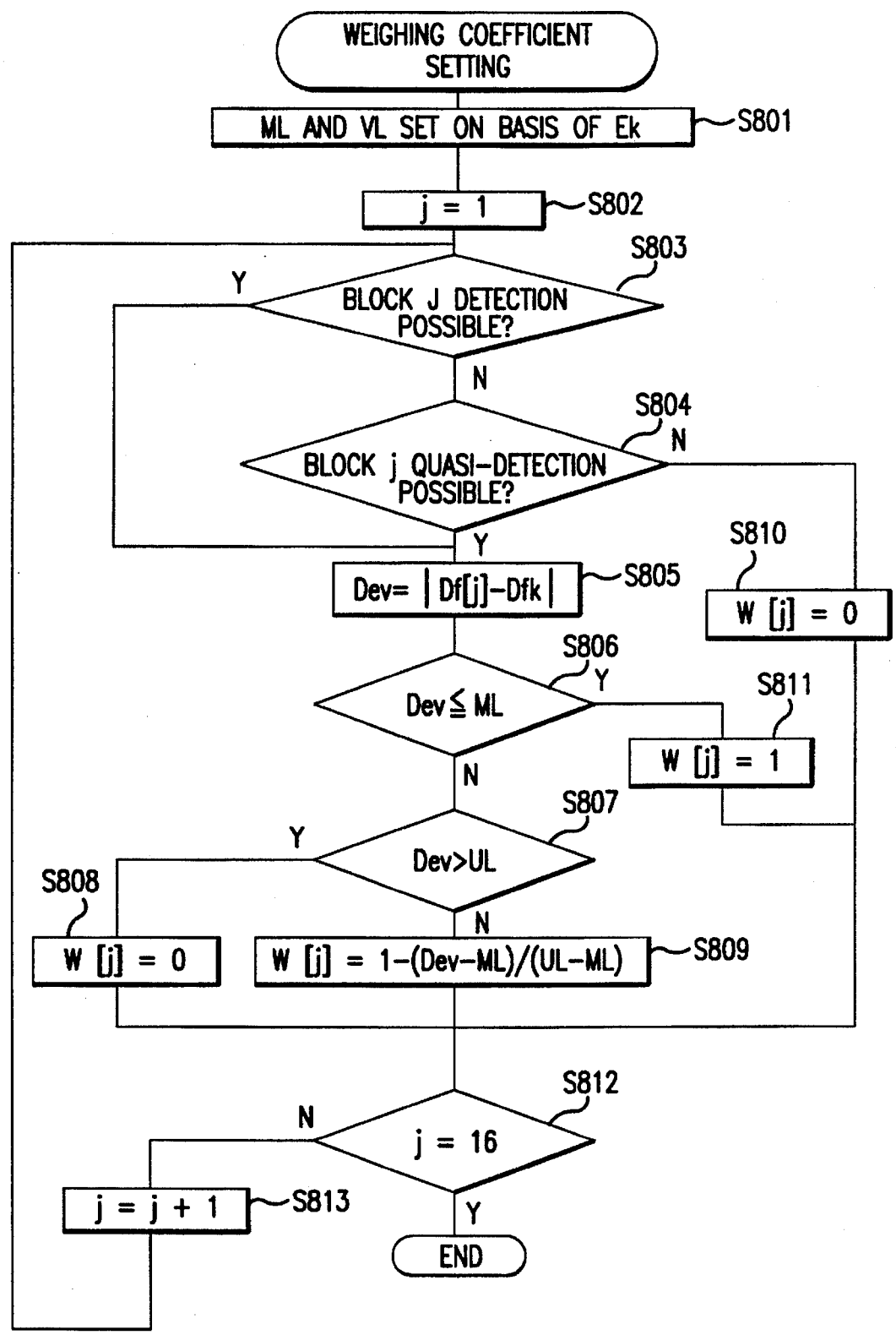
FIG. 10 is a flowchart showing the weighing coefficient setting circuit in the present invention.

Weighing coefficient setting circuit 3i shown in FIG. 1 sets the weighing coefficients W[j] for each block from block 1 through block 16. Setting of the weighing coefficients will be described with reference to FIG. 10.

Figure 25:
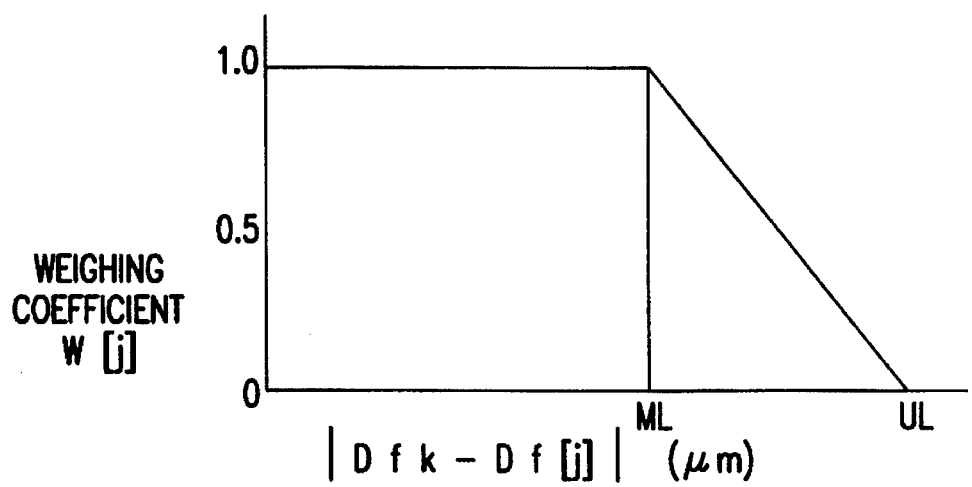
FIG. 25 is a drawing showing a method for setting the weighing coefficient.
Figure 26A:
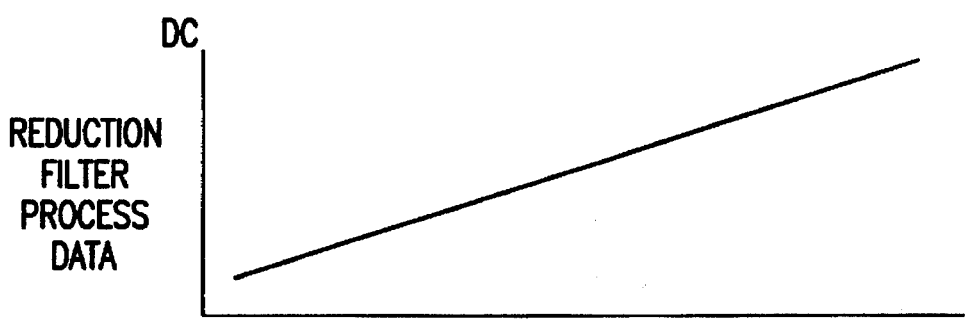
FIGS. 26(a)-(b) illustrate a difficult subject in filter process data that does not completely eliminate the DC component.
Figure 26B:
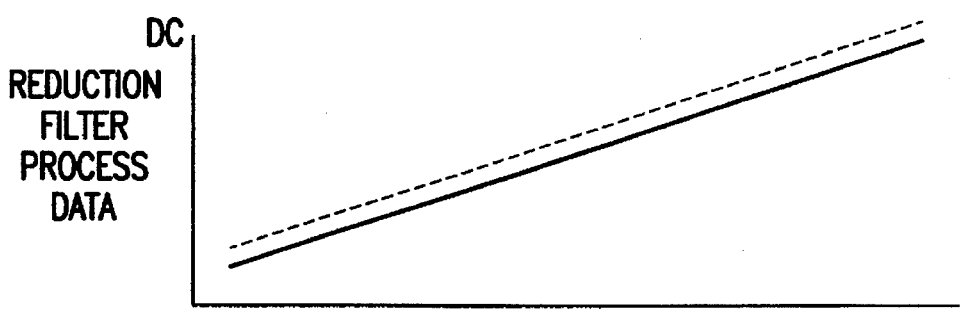
Figure 27:
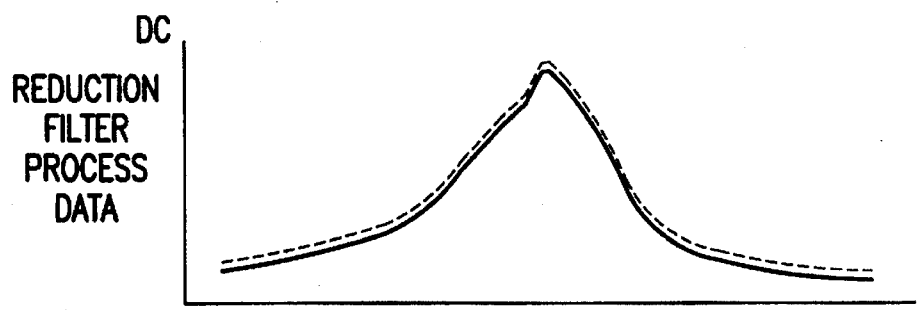
FIG. 27 is a drawing that illustrates the case where there is little effect even from algorithm processes using filter process data that does not completely eliminate the DC component when unbalance is created in the pair of output signals [i]

In step S801, numerical values ML and UL in FIG. 25 are set on the basis of standard information amount Ek as shown in formulae 53 to 55.

When $Ek>ZE$, $ML=Lm$ (53)

When $Ek \leq ZE$, $ML=(ZE-Ek)/Ct+Lm$ (54)

$UL=ML+Cr$ (55)

In formulae 53 to 55, ZE is a predetermined value, with a sufficiently large value being preferable, and a preferably value around twice that of threshold value Ea1 in formula 41. Cr is a constant that determines the range over which weighing coefficients W[j] change from 1 to 0, with values from 40 to 60 μm being good. Lm is a constant that determines the range over which W[j]=1 when the standard information amount Ek is sufficiently large, with values from 30 to 60 μm being good. Ct is an appropriate constant and is set to a value so that the value of the term (ZE−Ek)/Ct changes from 0 to about 50 μm according to the standard information amount Ek.

In step S802, the block number j where the weighing coefficient is to be set is set to 1. In step S803, the determination is made as to whether block j was determined by focus state detection circuit 3e to be a detection-possible block, and when the block is a detection-possible block, the process moves to step S805, while when the block is not a detection-possible block, the process moves to step S804.

In step S804, the determination is made as to whether block j was determined by focus state detection circuit 3e to be a quasi detection-possible block, and when the block is a quasi detection-possible block, the process moves to step S805, while when the block is not a quasi detection-possible block, the process moves to step S810.

In step S805, the absolute value Dev of the difference between the standard defocus amount Dfk and the defocus amount Df[j] of block j is computed using formula 56.

$Dev=|Df[j]-Dfk|$ (56)

In step S806, the determination is made as to whether the absolute value Dev of the difference is not greater than ML, and when this value is not greater than ML, the process moves to step S811, while when such is not the case, the process moves to step S807.

In step S807, the determination is made as to whether or not the absolute value Dev of the difference is larger than UL, and when this value is larger than UL, the process moves to step S808, while when such is not the case, the process moves to step S809.

In step S808, the weighing coefficient W[j] of block j is set to 0 because the absolute value Dev of the difference is larger than UL, and the process then moves to step S812.

In step S809, the weighing coefficient W[j] of block j is set using formula 57, and the process then moves to step S812.

$$W[j]=1-(Dev-ML)/(UL-ML) \quad (57)$$

In step S810, the weighing coefficient W[j] of block j is set to 0 because block j is a detection-impossible block because the determination in step S803 was that the block was not a detection-possible block, and the determination in step S804 was that the block was not a quasi detection-possible block, or because algorithms have not been conducted. Following this, the process moves to step S812.

In step S811, the weighing coefficient W[j] of block j is set to 1 because it has been determined in step S806 that the absolute value Dev of the difference is not greater than ML, and following this, the process moves to step S812.

In step S812, the determination is made as to whether block number j is 16, that is to say, whether the setting of weighing coefficients for all blocks has been concluded, and when this process has been concluded, the operation is concluded, while when the process has not been concluded, the process moves to step S813.

In step S813, the block number is changed by adding 1 to block number j, and the process returns to step S803.

In this way, because ML and UL become larger values the smaller the standard information amount Ek is according to formula 55, the range where the weighing coefficients W[j] are not 0 is wider than when the standard information amount Ek is large. Accordingly, the number of blocks where the weighing coefficient W[j] is not 0 increases, the defocus amounts from a larger number of blocks are used in combination algorithms in below-described combination execution circuit 3j, and it becomes possible to obtain a stable combined defocus amount.

Combination execution circuit 3j shown in FIG. 1 computes a combined defocus amount Dfm and combined information amount Em by combining the defocus amounts from block 1 through block 16 using formulae 18 and 19.

In the illustrated embodiment, the algorithm process circuit 3 is implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the algorithm process circuit 3 can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The algorithm process circuit 3 can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 2–11 can be used as the algorithm process circuit 3. As shown, a distributed processing architecture is preferred for maximum data/signal processing capability and speed.

Figure 2:
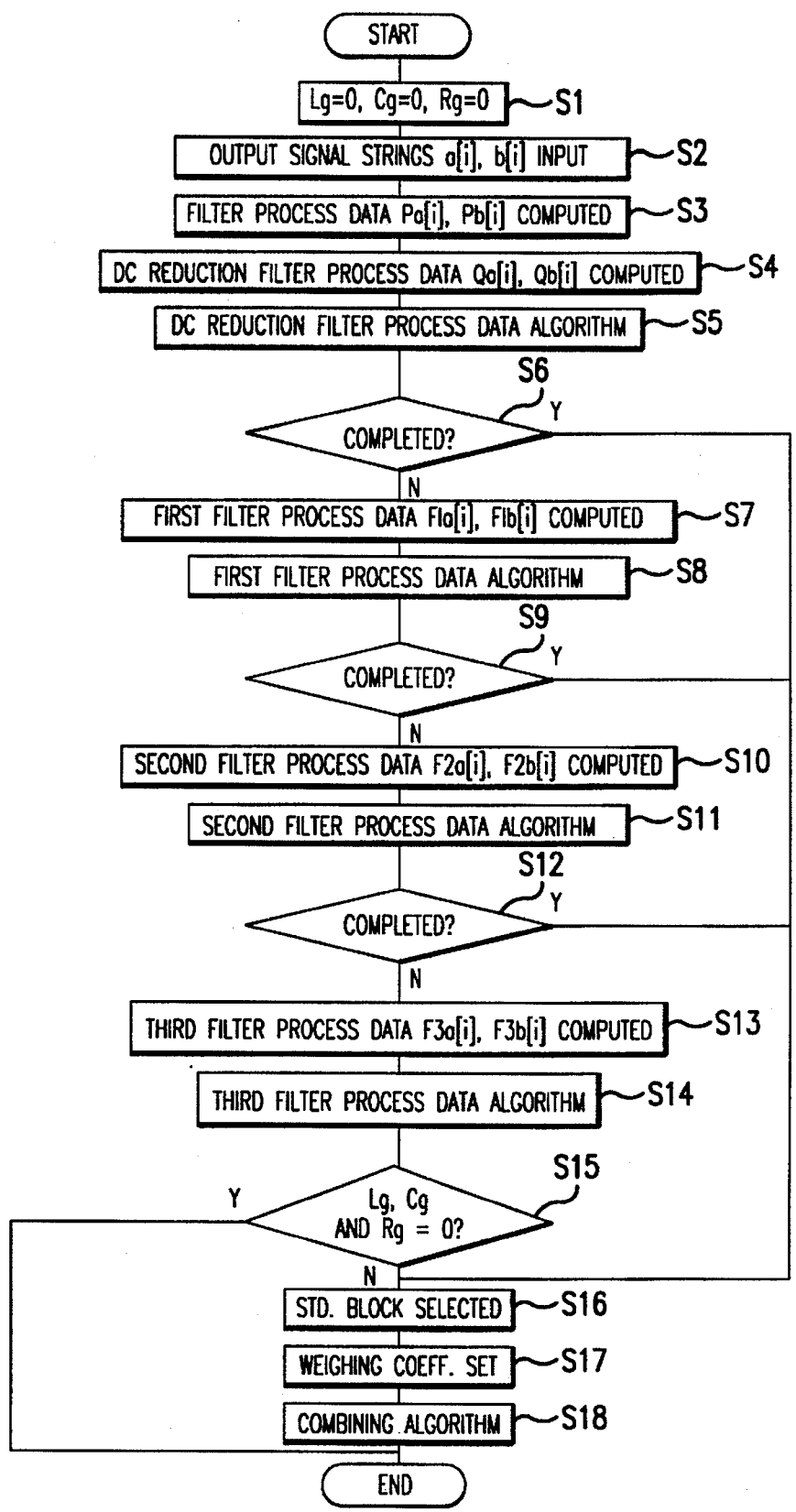
FIG. 2 is a flowchart showing the operation of the present invention.

Next, the operation of the present invention will be described with reference to FIG. 2. Details relating to algorithm processes using each of the filter process data types will be described hereafter with reference to other drawings.

In step S1, numerical values Lg, Cg and Rg, which indicate whether the above-described three regions Lf, Cf and Rf are focus state detection possible, are all set to 0. These numerical values indicate that the corresponding region is detection-possible when the value is 1 and indicate that the corresponding region is detection-impossible when the value is 0.

In step S2, the output signal strings a[i] and b[i] from image sensor 2 are input. In step S3, high frequency elimination filter process data Pa[i] and Pb[i] are computed using formulae 12 and 13. In step S4, DC reduction filter process data Qa[i] and Qb[i] are computed using formulae 16 and 17.

In step S5, an algorithm (hereafter called the DC reduction filter process data algorithm) is executed using DC reduction filter process data Qa[i] and Qb[i]. Details of this algorithm will be described hereafter with reference to FIG. 3.

In step S6, the process moves to step S16 when it has been determined by algorithm completion determination circuit 3g that the algorithms have been completed, while the process moves to step S7 when it has been determined that algorithms are continuing.

In step S7, first filter process data F1a[i] and F1b[i] are computed with s=2 in formulae 14 and 15. In step S8, an algorithm (hereafter called the first filter process data algorithm) is executed using first filter process data F1a[i] and F1b[i]. Details of this algorithm will be described hereafter with reference to FIG. 4.

In step S9, when it is determined by algorithm completion determination circuit 3g that algorithms have been completed, the process moves to step S16, while when the determination is that algorithms are continuing, the process moves to step S10.

In step S10, the second filter process data F2a[i] and F2b[i] are computed with s=4 in formulae 14 and 15. In step S11, an algorithm (hereafter called the second filter process data algorithm) is executed using second filter process data F2a[i] and F2b[i]. Details of this algorithm will be described hereafter with reference to FIG. 5.

In step S12, when it is determined by algorithm completion determination circuit 3g that algorithms have been completed, the process moves to step S16, while when the determination is that algorithms are continuing, the process moves to step S13.

In step S13, the third filter process data F3a[i] and F3b[i] are computed with s=8 in formulae 14 and 15. In step S14, an algorithm (hereafter called the third filter process data algorithm) is executed using third filter process data F3a[i] and F3b[i]. Details of this algorithm will be described hereafter with reference to FIG. 6.

In step S15, the determination is made as to whether all of Lg, Cg and Rg are 0, that is to say, whether all regions are detection-impossible regions, and when the determination is that all regions are detection-impossible, the operation is concluded, while when there is a region that is detection-possible, the process moves to step S16.

Figure 9:
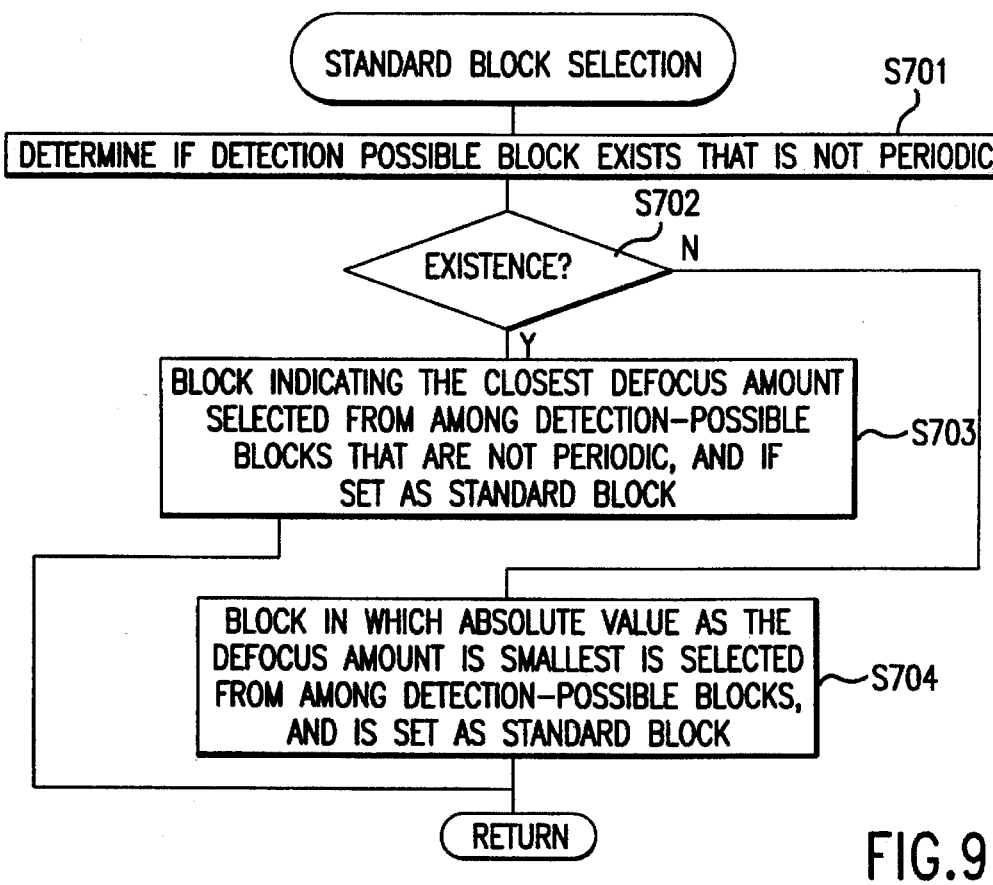
FIG. 9 is a flowchart showing the standard block setting circuit in the present invention.

In step S16, a standard block is set by the above-described operation in FIG. 9 by the standard block setting circuit 3h. In step S17, weighing coefficients W[j] are set for each block using the above-described operation in FIG. 10 by weighing coefficient setting circuit 3i.

In step S18, the combined defocus amount Dfm is computed by combination execution circuit 3j. The combined defocus amount Dfm is set as the final defocus amount.

Shooting lens 100 is driven by an unrepresented motor on the basis of the combined defocus amount Dfm obtained in this manner, and the focus state of shooting lens 100 is displayed by a display device (not shown). Above-described steps S3, S4, S11 and S14 are operations of filter process circuit 3a, while steps S6, S9 and S12 are operations of algorithm completion determination circuit 3g.

Next, details of the algorithm process using DC reduction filter process data will be described with reference to FIG. 3.

In step S101, block number j is set to 1. In step S102, the algorithm range is set by algorithm range setting circuit 3b by determining the first term k0[j] and last term r0[j] of block j. In step S103, the determination is made by subject pattern determination circuit 3c as to whether block j is a difficult subject block using the above-described operation in FIG. 11.

Figure 7:
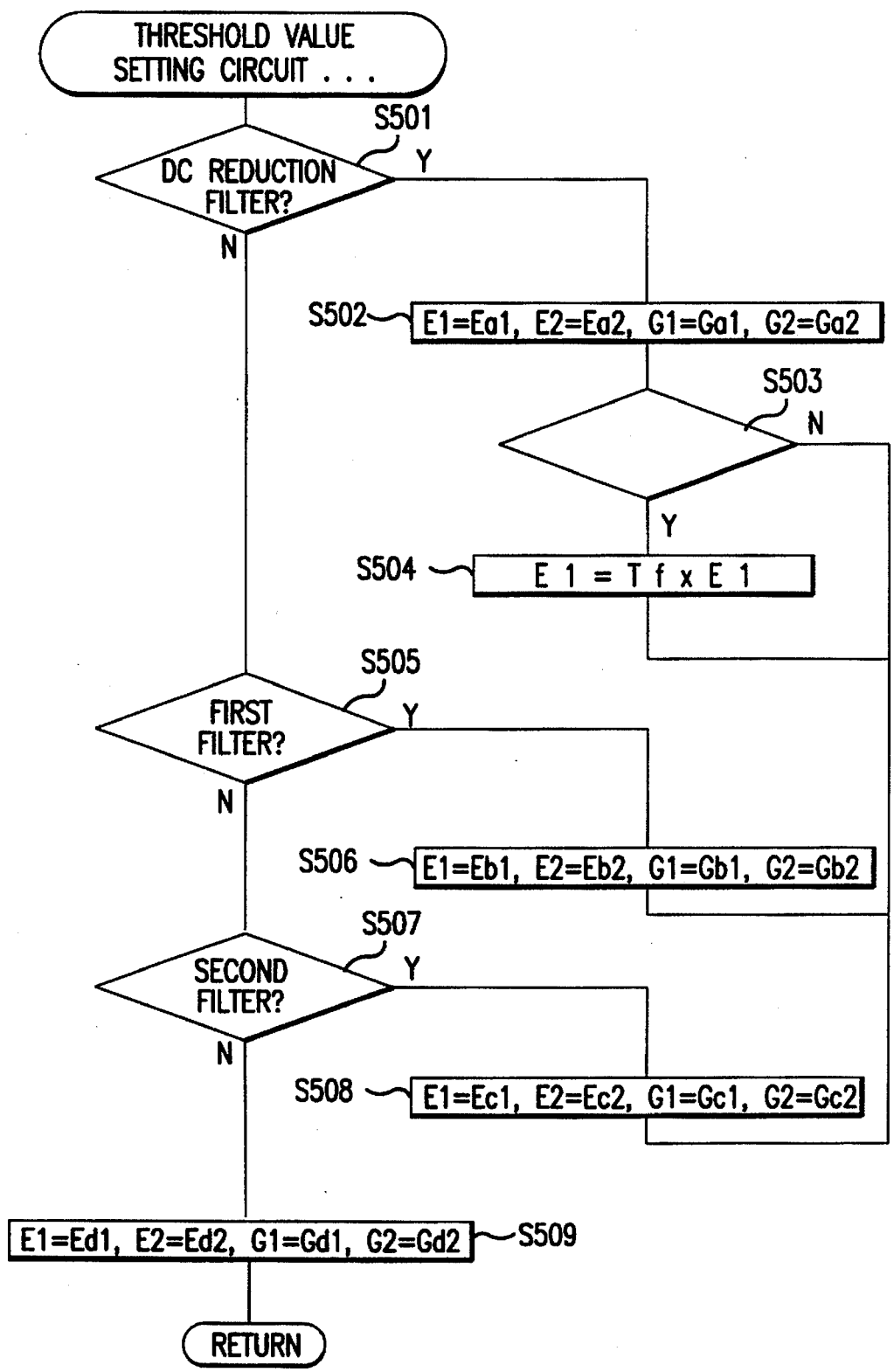
FIG. 7 is a flowchart showing the threshold value setting circuit in the present invention.
Figure 8:
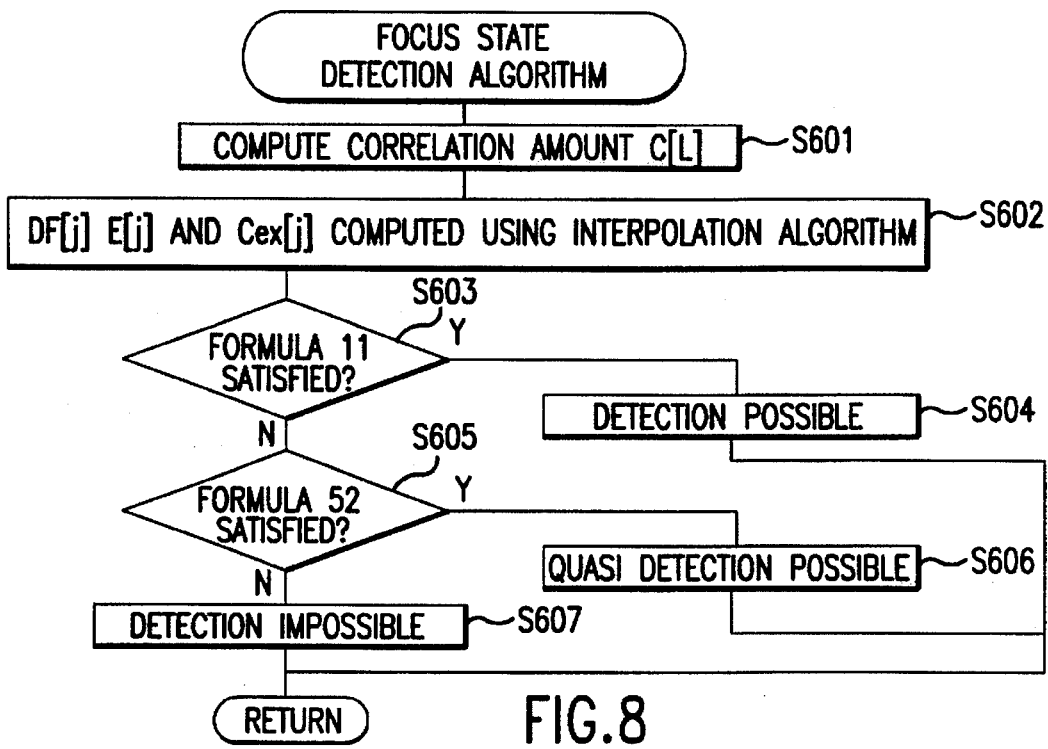
FIG. 8 is a flowchart showing the focus state detection algorithm circuit in the present invention.

In step S104, the above-described processes of FIG. 7 are conducted by threshold value setting circuit 3d, and threshold values E1, E2, G1 and G2, which determine the level of confidence, are set. In step S105, the above-described process of FIG. 8 is conducted by focus state detection algorithm circuit 3e, defocus amount Df[j], information amount E[j] and true smallest value Cex[j] are computed, and the determination is made as to whether block j is a detection-possible block, a quasi detection-possible block or a detection-impossible block.

In step S106, the determination is made by periodic subject determination circuit 3f as to whether block j is a periodic block, when block j is detection-possible. In step S107, the determination is made as to whether or not block number j is 6, that is to say, whether or not focus state detection algorithms have been completed for all blocks in DC reduction filter process data, and when all algorithms have been concluded, the process moves to step S109, while when the algorithms have not been concluded, the process moves to step S108. In step S108, because focus state detection algorithms have not been completed on block 6, the block number j is changed by adding 1 to block number j, and the process then returns to step S102.

In step S109, the determination is made as to whether at least one out of block 1 and block 2 is a detection-possible block, and when one of these is detection-possible, the process moves to step S110, while when neither is detection-possible, the process moves to step S111. In step S110, region Lf is determined to be detection-possible because at least one out of block 1 and block 2 is a detection possible block, so Lg is set to 1.

In step S111, the determination is made as to whether at least one out of block 3 and block 4 is a detection-possible block, and when one of these is a detection-possible, the process moves to step S112, while when neither is detection-possible, the process moves to step S113. In step S112, region Cf is determined to be detection-possible because at least one out of block 3 and block 4 is a detection possible block, so Cg is set to 1.

In step S113, the determination is made as to whether at least one out of block 5 and block 6 is a detection-possible block, and when one of these is detection-possible, the process moves to step S114, while when neither is detection-possible, the process moves to step S115. In step S114, region Rf is determined to be detection-possible because at least one out of block 5 and block 6 is a detection possible block, so Rg is set to 1.

In step S115, the determination is made as to whether all of Lg, Cg and Rg are 1, that is to say, whether all of regions Lf, Cf and Rf are detection-possible, and if all regions are detection-possible, the process moves to step S116, while otherwise the process moves to step S117. In step S116, the determination is made that algorithms have been completed because all of regions Lf, Cf and Rf are focus state detection-possible, so the operation is concluded. In step S117, the determination is made that algorithms are continuing because a detection-impossible region exists among Lf, Cf and Rf, and the operation is concluded.

Figure 3:
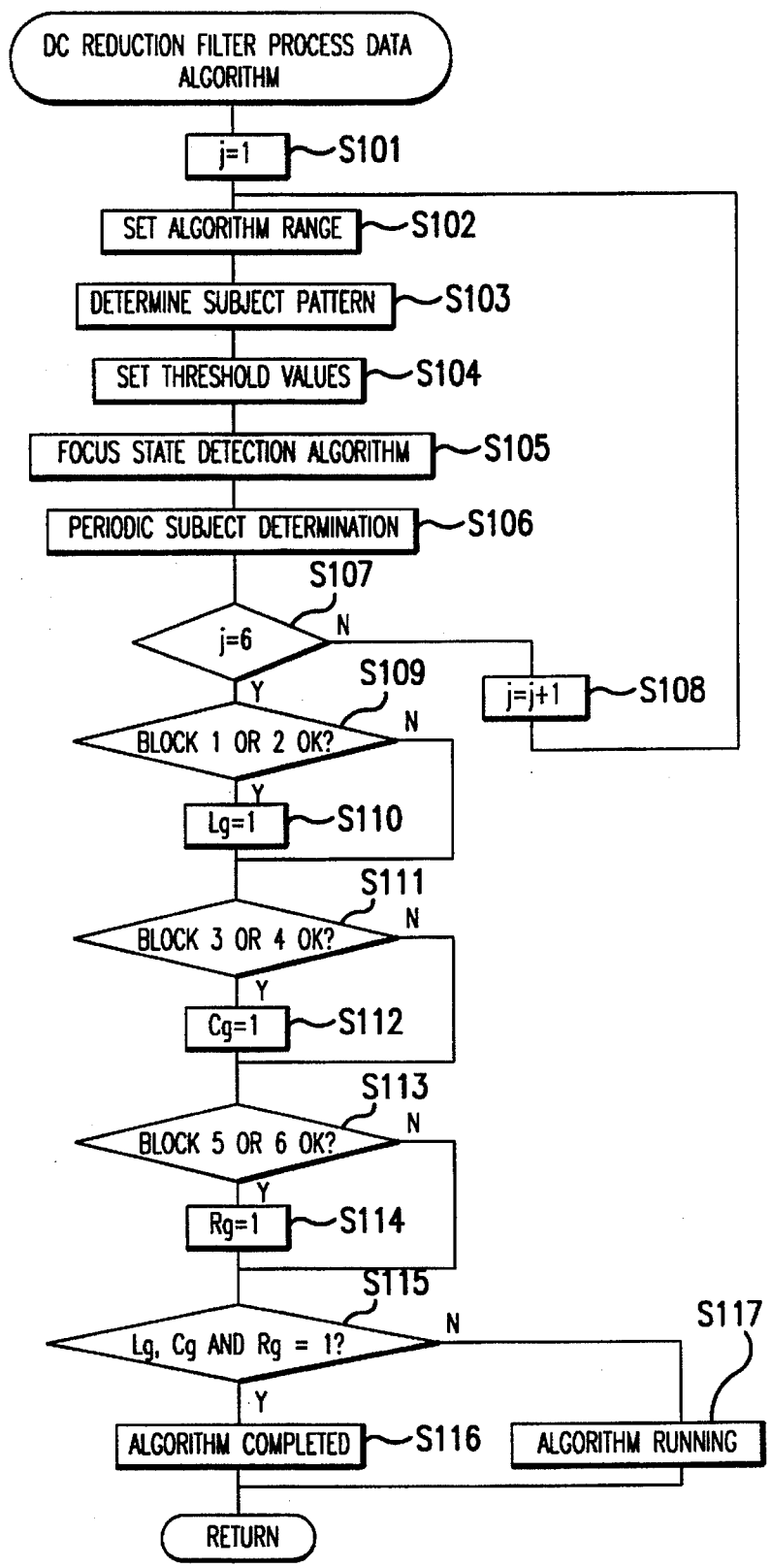
FIG. 3 is a flowchart showing the algorithm process using DC reduction filter process data in the present invention.

Steps S109 through S117 in the operation in above-described FIG. 3 are operations conducted by algorithm completion determination circuit 3g.

Next, details of the algorithm process using first filter process data will be described with reference to FIG. 4.

In step S201, the determination is made as to whether all of Lg, Cg and Rg are 0, that is to say, whether all regions are detection-impossible, and when all regions are detection-impossible, the process moves to step S202, while when there is a detection-possible region, the process moves to step S217 without conducting the focus state detection algorithms using first filter process data.

Because the DC reduction filter process data used prior to the first filter process data also includes high frequency components, it is not necessary to use both. However, when all regions are made detection-impossible with the above-described algorithm process using DC reduction filter process data, there are cases where ghosting or the like is created by shooting lens 100, and the balance within output signals a[i] and b[i] from image sensor 2 becomes extremely chaotic, and in this type of case, it is necessary to conduct focus state detection algorithms using the first filter process data.

In step S202, block number j is set to 7. In step S203, the algorithm range is set by algorithm range setting circuit 3b by determining the first term k0[j] and the last term r0[j] for block j. In step S204, the above-described processes of FIG. 7 are conducted by threshold value setting circuit 3d, and threshold values E1, E2, G1 and G2, which determine the level of confidence, are set.

In step S205, the above-described process of FIG. 8 is conducted by focus state detection algorithm circuit 3e, defocus amount Df[j], information amount E[j] and true smallest value Cex[j] are computed, and the determination is made as to whether block j is a detection-possible block, a quasi detection-possible block or a detection-impossible block.

In step S206, the determination is made by periodic subject determination circuit 3f as to whether block j is a periodic block, when block j is detection-possible.

In step S207, the determination is made as to whether block number j is 12, that is to say, whether or not focus state detection algorithms have been completed for all blocks in first filter process data, and when all algorithms have been concluded, the process moves to step S209, while when the algorithms have not been concluded, the process moves to step S208. In step S208, because focus state detection algorithms have not been completed on block 12, the block number j is changed by adding 1 to block number j, and the process then returns to step S203.

In step S209, the determination is made as to whether or not at least one out of block 7 and block 8 is a detection-possible block, and when one of these is detection-possible, the process moves to step S210, while when neither is detection-possible, the process moves to step S211. In step S210, region Lf is determined to be detection-possible because at least one out of block 7 and block 8 is a detection possible block, so Lg is set to 1.

In step S211, the determination is made as to whether at least one out of block 9 and block 10 is a detection-possible block, and when one of these is a detection-possible, the process moves to step S212, while when neither is detection-possible, the process moves to step S213. In step S212, region Cf is determined to be detection-possible because at least one out of block 9 and block 10 is a detection possible block, so Cg is set to 1.

In step S213, the determination is made as to whether at least one out of block 11 and block 12 is a detection-possible block, and when one of these is a detection-possible, the process moves to step S214, while when neither is detection-possible, the process moves to step S215. In step S214, region Rf is determined to be detection-possible because at least one out of block 11 and block 12 is a detection possible block, so Rg is set to 1.

In step S215, the determination is made as to whether all of Lg, Cg and Rg are 1, that is to say whether all of regions Lf, Cf and Rf are detection-possible, and if all regions are detection-possible, the process moves to step S216, while otherwise, the process moves to step S217. In step S216, the determination is made that algorithms have been completed because all of regions Lf, Cf and Rf are focus state detection-possible, and the operation is concluded.

In step S217, the determination is made that algorithms are continuing because a detection-impossible regions exists among Lf, Cf and Rf, and then the operation is concluded.

Figure 4:
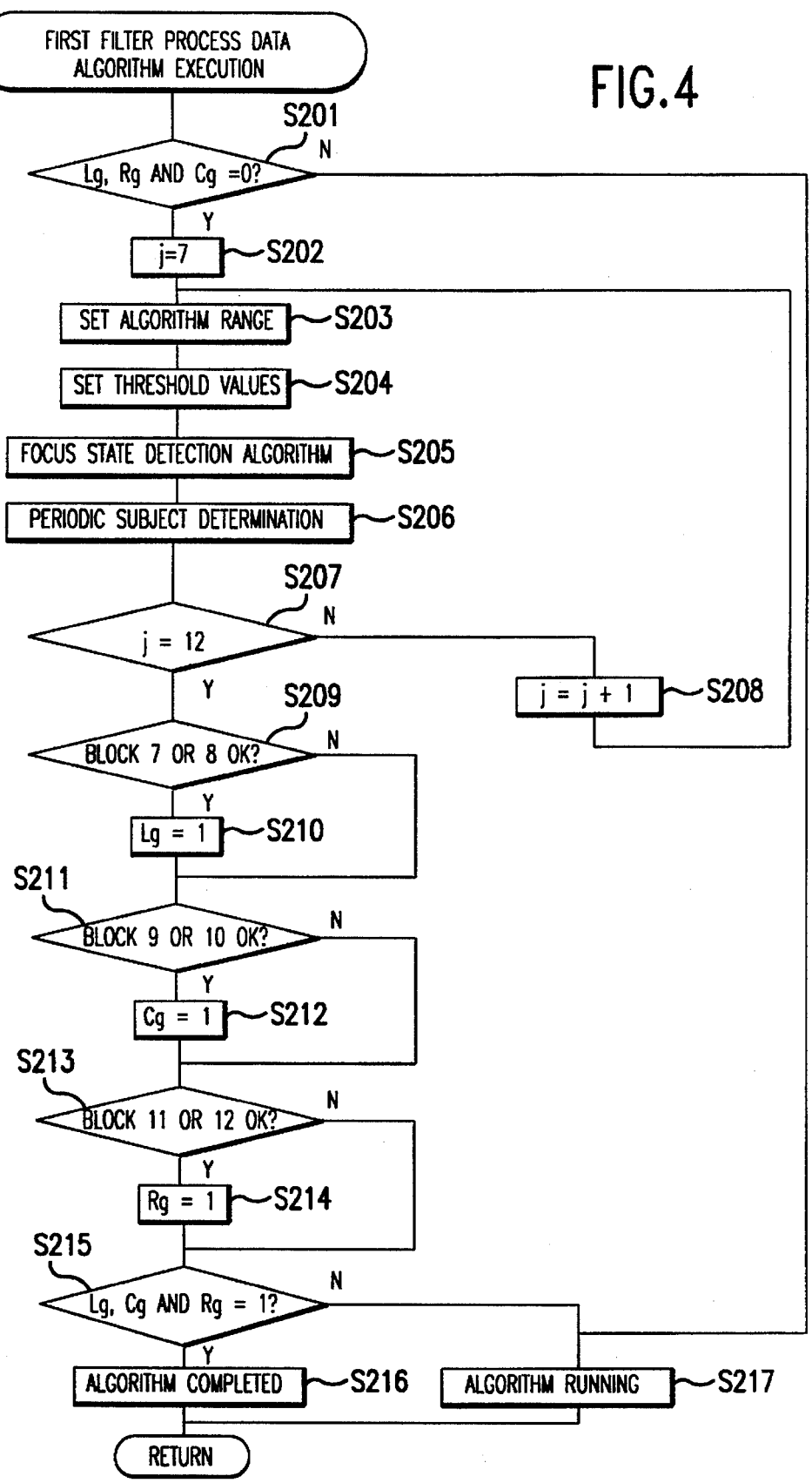
FIG. 4 is a flowchart showing the algorithm process using first filter process data in the present invention.

In the operation in above-described FIG. 4, steps S209 through S217 are operations conducted by algorithm completion determination circuit 3g.

Next, details of the algorithm process using second filter process data will be described with reference to FIG. 5.

In step S301, the determination is made as to whether Lg is 0, that is to say, whether region Lf is detection-impossible, and when region Lf is detection-impossible, the process moves to step S302, while if the region is detection-possible, the process moves to step S309 because it is not necessary to conduct algorithms on region Lf, that is to say block 13, with second filter process data.

In step S302, block number j is set to 13. In step S303, the algorithm range is set by algorithm range setting circuit 3b by determining the first term k0[j] and the last term r0[j] for block 13.

In step S304, the above-described processes of FIG. 7 are conducted by threshold value setting circuit 3d, and threshold values E1, E2, G1 and G2, which determine the level of confidence, are set. In step S305, the above-described process of FIG. 8 is conducted by focus state detection algorithm circuit 3e, defocus amount Df[j], information amount E[j] and true smallest value Cex[j] are computed, and the determination is made as to whether block 13 is a detection-possible block, a quasi detection-possible block or a detection-impossible block.

In step S306, the determination is made by periodic subject determination circuit 3f as to whether block 13 is a periodic block, when block 13 is detection-possible. In step S307, the process moves to step S308 when block 13 is a detection-possible block, and otherwise moves to step S309. In step S308, the determination is that region Lf is detection-possible because block 13 is a detection-possible block, so Lg is set to 1.

In step S309, the determination is made as to whether Cg is 0, that is to say, whether region Cf is detection-impossible, and when region Cf is detection-impossible, the process moves to step S310, while if the region is detection-possible, the process moves to step S317 because it is not necessary to conduct algorithms on region Cf, that is to say block 14, with second filter process data. In step S310, block number j is set to 14.

In step S311, the algorithm range is set by algorithm range setting circuit 3b by determining the first term k0[j] and the last term r0[j] for block 14. In step S312, the above-described processes of FIG. 7 are conducted by threshold value setting circuit 3d, and threshold values E1, E2, G1 and G2, which determine the level of confidence, are set.

In step S313, the above-described process of FIG. 8 is conducted by focus state detection algorithm circuit 3e, defocus amount Df[j], information amount E[j] and true smallest value Cex[j] are computed, and the determination is made as to whether block 14 is a detection-possible block, a quasi detection-possible block or a detection-impossible block. In step S314, the determination is made by periodic subject determination circuit 3f as to whether block 14 is a periodic block, when block 14 is detection-possible.

In step S315, the process moves to step S316 when block 14 is a detection-possible block, and otherwise moves to step S317. In step S316, the determination is that region Cf is detection-possible because block 14 is a detection-possible block, so Cg is set to 1.

In step S317, the determination is made as to whether Rg is 0, that is to say, whether region Rf is detection-impossible, and when region Rf is detection-impossible, the process moves to step S318, while if the region is detection-possible, the process moves to step S325 because it is not necessary to conduct algorithms on region Rf, that is to say block 15, with second filter process data.

In step S318, block number j is set to 15. In step S319, the algorithm range is set by algorithm range setting circuit 3b by determining the first term k0[j] and the last term r0[j] for block 15. In step S320, the above-described processes of FIG. 7 are conducted by threshold value setting circuit 3d, and threshold values E1, E2, G1 and G2, which determine the level of confidence, are set.

In step S321, the above-described process of FIG. 8 is conducted by focus state detection algorithm circuit 3e, defocus amount Df[j], information amount E[j] and true smallest value Cex[j] are computed, and the determination is made as to whether block 15 is a detection-possible block, a quasi detection-possible block or a detection-impossible block.

In step S322, the determination is made by periodic subject determination circuit 3f as to whether block 15 is a periodic block, when block 15 is detection-possible. In step S323, the process moves to step S324 when block 15 is a detection-possible block, and otherwise moves to step S325. In step S324, the determination is that region Rf is detection-possible because block 15 is a detection-possible block, so Rg is set to 1.

In step S325, the determination is made as to whether all of Lg, Cg and Rg are 0, that is to say whether all of regions Lf, Cf and Rf are detection-impossible, and if all regions are detection-impossible, the process moves to step S327, while if there is a detection-possible region, the process moves to step S326.

Because no distinction of regions Lf, Cf and Rf is made and the region is only block 16 in the third filter process data used in the next algorithm process step S326, it is not necessary to conduct algorithms using the third filter process data if there is a region that is detection-possible at this point, so the determination is made that the algorithms have been completed, and the operation is then concluded.

In step S327, the determination is made that algorithms are continuing because all of the regions are detection-impossible, and then the operation is concluded.

Figure 5:
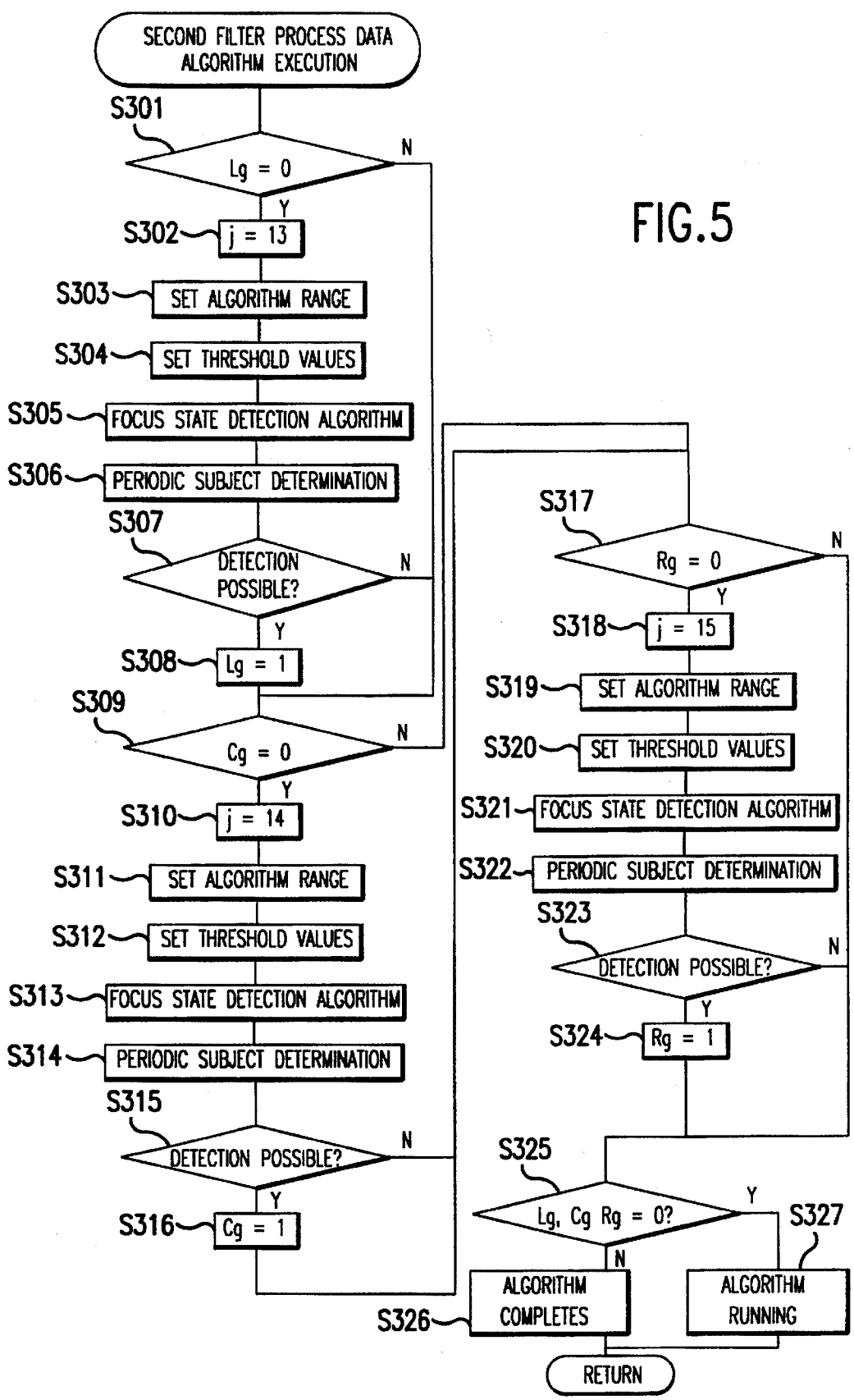
FIG. 5 is a flowchart showing the algorithm process using second filter process data in the present invention.

In the operation in above-described FIG. 5, steps S307, S308, S315, S316 and S323 through S327 are operations conducted by algorithm completion determination circuit 3g.

Next, details of the algorithm process using third filter process data will be described with reference to FIG. 6.

In step S401, block number j is set to 16. In step S402, the algorithm range is set by algorithm range setting circuit 3b by determining the first term k0[j] and the last term r0[j] for block 16. In step S403, the above-described processes of FIG. 7 are conducted by threshold value setting circuit 3d, and threshold values E1, E2, G1 and G2, which determine the level of confidence, are set.

In step S404, the above-described process of FIG. 8 is conducted by focus state detection algorithm circuit 3e, defocus amount Df[j], information amount E[j] and true smallest value Cex[j] are computed, and the determination is made as to whether block 16 is a detection-possible block, a quasi detection-possible block or a detection-impossible block.

In step S405, the determination is made by periodic subject determination circuit 3f as to whether block 16 is a periodic block, when block 16 is detection-possible. In step S406, the determination is made as to whether block 16 is a detection-possible block, and the process moves to step S407 when block 16 is a detection-possible block, and moves to step S408 when block 16 is not detection-possible.

In step S407, the determination is that regions Lf, Cf and Rf are detection-possible if block 16 is a detection-possible block because block 16 corresponds to all of the regions, so Lg, Cg and Rg are set to 1.

In step S408, the determination is made that algorithms have been completed because the third filter process data is the final filter process data, so the operation is then concluded.

Figure 6:
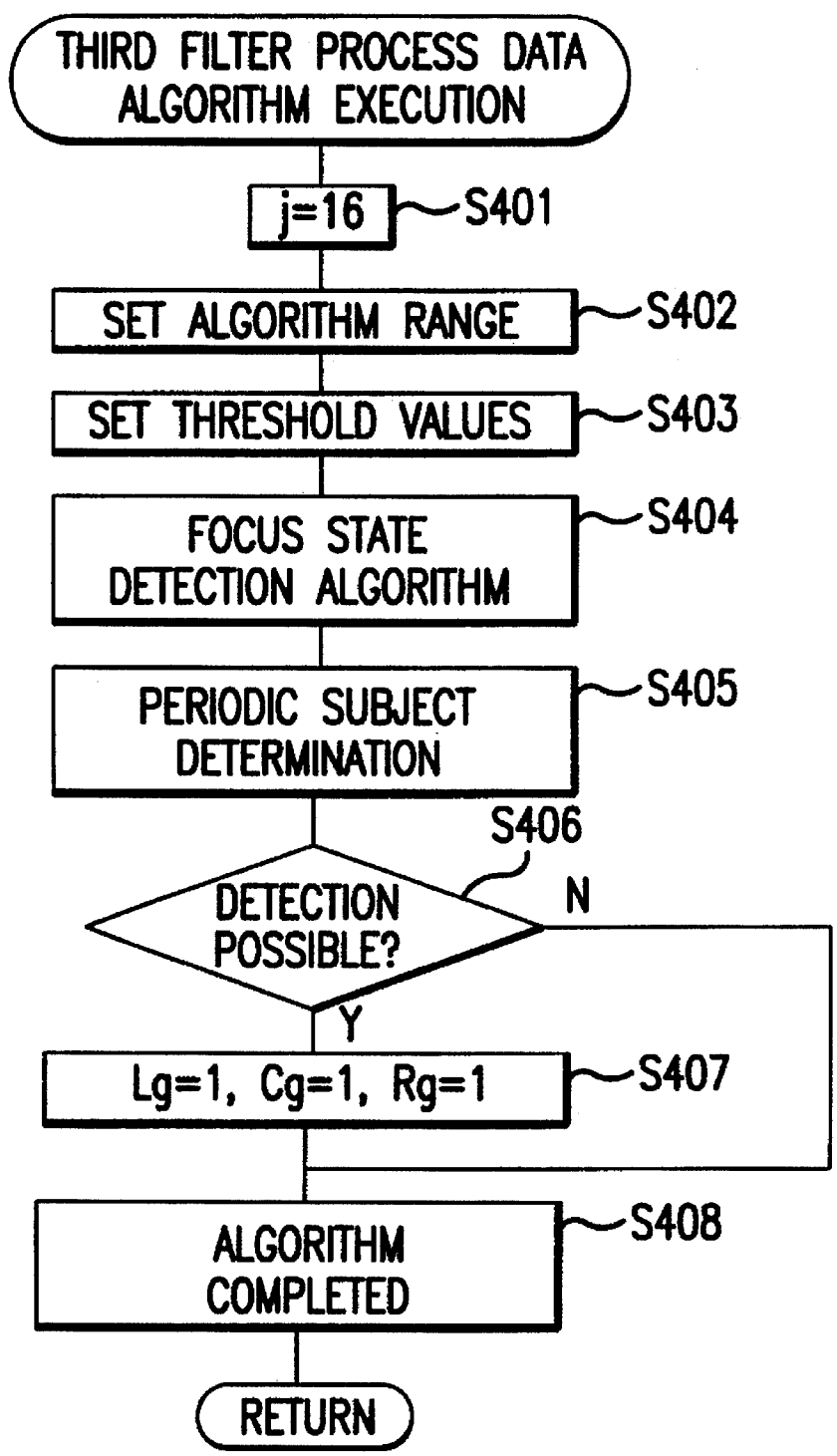
FIG. 6 is a flowchart showing the algorithm process using third filter process data in the present invention.

In the operation in above-described FIG. 6, steps S406 through S408 are operations conducted by algorithm completion determination circuit 3g.

In the above-described operation of the present invention, threshold value E1 is set more strictly by threshold value setting circuit 3d using formula 41 for blocks that have been determined to be difficult subjects by subject pattern determination circuit 3c, but the method also exists wherein difficult subject blocks are determined to be detection-impossible blocks without conducting focus state detection algorithms using formulae 1 through 11 and formula 52.

In this way, the present invention can be applied to a focus state detection device that conducts algorithm processes by switching a plurality of filter process data and that determines using algorithm completion determination circuit 3g whether to conduct algorithm processes using the next filter process data after conducting algorithms with each filter process data. Furthermore, the focus state detection area is divided into a plurality of regions as shown in FIGS. 12(a)–(d), a region is determined to be detection-possible when a block that is detection-possible is included in the region, and the algorithm is concluded when all regions are focus state detection-possible, and consequently, it is possible to detect with good precision the defocus amount of each subject when a subject composed only of low frequency components and a subject that includes high frequency components are intermixed.

In addition, the order of switching filter process data is in descending order of frequency, from the filter process data that extracts high frequency components to the filter process data that extracts low frequency components, and consequently, focus state detection algorithms can be conducted giving priority to highly precise defocus amounts. In addition, algorithms are determined to have been completed when all regions are detection-possible, but it is also fine for algorithms to be completed when a specific region becomes detection-possible.

In addition, focus state detection algorithm circuit 3e computes a defocus amount Df[j] for each block and conducts a determination for each block as to whether focus state detection is possible; periodic subject determination circuit 3f conducts a determination for each block as to whether the block has a periodic pattern; standard block setting circuit 3h sets as the standard block the block in which the absolute value of the defocus amount is a minimum, that is to say, the block in which the defocus amount is closest to the in-focus state of shooting lens 100, when all detection-possible blocks are periodic blocks; weighing coefficient setting circuit 3i sets a weighing coefficient for each block on the basis of the standard block; and combination execution circuit 3j determines a weighted average of the defocus amount for each block using the weighing coefficient to compute a combination defocus amount. Consequently, focus state detection is possible even when the subject is completely periodic if shooting lens 100 is not defocussed by a very large amount.

Accordingly, the photographer can conduct the focus state detection action with respect to a completely periodic subject after effecting focussing of the shooting lens 100 with respect to a subject that is about the same distance away as the completely periodic subject, or the photographer can conduct the focus state detection action with respect to a completely periodic subject after manually moving the shooting lens to roughly near the focussing position, so that focus state detection is possible with respect to a completely periodic subject. In addition, when a block exists wherein detection is possible but the block is not a periodic block, a periodic block is not set as the standard block, and the standard block is selected out of the blocks that are not periodic blocks where detection is possible, and hence, no false focussing is created.

In addition, weighing coefficient setting circuit 3i varies the weighing coefficient set on the basis of the difference between the defocus amount of each block and the defocus amount of the standard block, the variation being made on the basis of the information amount of the standard block (the standard information amount) Ek. Furthermore, when the standard information amount Ek is small, the range where the weighing coefficients W[j] are not 0 is wider than when the standard information amount Ek is large, and consequently, the number of blocks where the weighing coefficient W[j] is not 0 increases, the defocus amounts from a larger number of blocks are used in combination algorithms in below-described combination execution circuit 3j, and it becomes possible to obtain a stable combined defocus amount.

In addition, subject pattern determination circuit 3c determines that patterns in which the change in contrast is gentle and is monotonically increasing or monotonically decreasing are difficult subjects, and when the subject is a difficult subject, the threshold value that determines the information amount is set more strictly than normal by threshold value setting circuit 3d, while a level of confidence determination is conducted in focus state detection circuit 3e using this threshold value, and a determination is made as to whether focus state detection is possible. Consequently, it becomes difficult to determine that focus state detection is possible in the case of difficult subjects, making it possible to avoid obtaining unstable defocus amounts.

In addition, in a focus state detection device that conducts block division, a determination is made by subject pattern determination circuit 3c for each block that patterns wherein the change in the contrast is gentle and monotonically increasing are difficult subjects, and in the case of a difficult subject block, the threshold value that determines the information amount is set more strictly than normal by threshold value setting circuit 3d, a level of confidence determination is conducted in focus state detection circuit 3e using this threshold value, and the determination is made as to whether the block is a detection-possible block. Difficult subject blocks do not become the standard block because the standard block is selected by the standard block setting circuit out of those blocks that are detection-possible, and it thus becomes possible to obtain a stable combined defocus amount using combination execution circuit 3j.

In addition, subject pattern determination circuit 3c computes a plurality of absolute values of the difference between two data items within a predetermined range, detects the maximum value out of these values and uses this value in determinations, and consequently, patterns that are monotonically increasing but have a rapid change are not determined to be difficult subjects. In addition, because the contrast and peak-to-peak value within a certain range are used in determinations, patterns that have a gentle change but are not monotonically increasing are also not determined to be difficult subjects, so that it is possible to conduct accurate subject pattern determinations. In addition, when a subject is determined to be a difficult subject, the threshold value is set more strictly by a factor of 1.5 to 4 compared with normal, and hence, the information amount is increased despite the fact that the subject is a difficult subject, and it becomes possible for the block to be a detection-possible block despite being a difficult subject block when a highly precise defocus amount can be obtained.

In the embodiment having the configuration described above, image sensor array 2 corresponds to the photoelectric conversion element array, filter process circuit 3a corresponds to the filter process means, algorithm range setting circuit 3b corresponds to the algorithm range setting means, focus state detection algorithm circuit 3e corresponds to the focus state detection algorithm means, algorithm completion determination circuit 3g corresponds to the algorithm completion determination means, combination execution circuit 3j corresponds to the defocus amount combination means, periodic subject determination circuit 3f corresponds to the periodic subject determination means, standard block setting circuit 3h corresponds to the standard block setting means, weighing coefficient setting circuit 3i corresponds to the weighing coefficient setting means, subject pattern determination circuit 3c corresponds to the subject pattern determination means, and threshold value setting circuit 3d corresponds to the threshold value setting means.

As described in detail above, one out of a plurality of filter algorithm processes is conducted on signal strings output from the photoelectric conversion element array and filter process data is output. The filter process data is divided into a plurality of blocks and a defocus amount is computed for each block, and the final focus adjustment state is determined only when the level of confidence of the defocus amount is high. Consequently, it is possible to accurately determine the defocus amounts of various subjects even when, for example, a subject composed only of low frequency components and a subject including high frequency components are intermixed.

Filter algorithm processes that extract high frequency components are conducted before filter algorithm processes that extract low frequency components, and consequently, the precision of computing defocus amounts is improved.

The determination is made as to whether the subject has a periodic pattern, a standard block is established on the basis of the results of this determination, and the final focus adjustment state is determined on the basis of the standard block. Consequently, focus state detection is possible even when the subject has a completely periodic pattern. In addition, when a block that does not have a periodic pattern exists within the photo field, blocks having a periodic pattern are not set as the standard block, and hence, a false focus does not occur.

A pair of photoelectric conversion element arrays are divided into a plurality of blocks, one of these blocks, which is determined to have high level of confidence, is set as a standard block, a weighing coefficient used in determining the weighted average of the defocus amounts of each block is computed on the basis of the contrast in the standard block, and the weighted average of the defocus amounts of each block is found on the basis of the weighing coefficient. Consequently, the precision of computing the defocus amount can be improved. That is to say, when the contrast in the standard block is low, the range wherein the weighing coefficient is not 0 is made wider so that the final defocus amount is determined on the basis of the defocus amounts from a larger number of blocks, and hence, the level of confidence of the final defocus amount is improved.

A pair of photoelectric conversion element arrays are divided into a plurality of blocks, a determination is made as to whether each block is a difficult subject block, and the threshold value that becomes a criterion for determining the level of confidence of the defocus amounts is set to a strict value in the case of difficult subject blocks. Consequently, there are few cases where focus state detection is determined to be possible with difficult subjects, so it is possible to maintain the precision of the final defocus amount at a constant level.

What is claimed is:

1. A focus state detection device for a camera having a shooting lens, the focus state detection device comprising:

a photoelectric conversion element array composed of a plurality of photoelectric conversion elements, said array outputting a string of signals in accordance with a light intensity distribution of a subject image;

a focus state detection optical system that guides light rays from a subject to the photoelectric conversion element array, the focus state detection optical system composing the subject image on the photoelectric conversion element array;

a filter processor having a plurality of filter algorithm processes that extract various frequency components from the signal string output from the photoelectric conversion element array, the filter processor conducting one of the plurality of filter algorithm processes on the signal string and outputting resulting filter process data;

an algorithm range setting device that divides the filter process data into blocks, the blocks becoming the units of focus state detection algorithms;

a focus state detection algorithm device that calculates a defocus amount for each block on the basis of the filter process data and that determines a level of confidence of the defocus amount;

an algorithm completion determination device that divides the signal string output from the photoelectric conversion array into a plurality of regions with the blocks being the boundaries, and for each of the plurality of regions, the algorithm completion determination device determining that focus state detection is possible in a respective region when the level of confidence is determined to be high in at least one of the blocks contained in the region, and when focus state detection is determined to be possible in all of the plurality of regions or all said filter processor processings end, the algorithm completion determining device halting the operation of the filter processor, the algorithm range setting device and the focus state detection algorithm device; and a final focus adjustment state determining device that determines the final focus adjustment state corresponding to the determination of said algorithm completion determining device.

2. The focus state detection device according to claim 1, wherein the filter algorithm processor conducts processes from filter algorithm processes that extract high frequency components to filter algorithm processes that extract low frequency components and conducts the plurality of filter algorithm processes in descending order of frequency components that are extracted.

3. A focus state detection device for a camera having a shooting lens, the focus state detection device comprising:

a pair of photoelectric conversion element arrays, each composed of a plurality of photoelectric conversion elements, each said array outputting a string of signals in accordance with a light intensity distribution of a subject image;

a focus state detection optical system that guides light rays from a subject to the pair of photoelectric conversion element arrays, the focus state detection optical system composing the subject image on the pair of photoelectric conversion element arrays;

an algorithm range setting device that divides the pair of signal strings into blocks, the blocks becoming the units of focus state detection algorithms;

a focus state detection algorithm device that for each block causes a relative shift between the pairs of signal strings and calculates a correlation amount for the pair of signal strings, the focus state detection algorithm device determining the level of confidence of the defocus amount calculated for each block on the basis of the correlation amount;

a periodic subject determination device that determines for each block whether the pair of signal strings is a periodic pattern signal;

a standard block setting device that, when at least one block exists in which it is determined by the periodic subject determination device that the signals are not periodic pattern signals while the level of confidence of the defocus amount has been determined to be high, sets one of the blocks to be a standard block; and a defocus amount combination device that determines a final focus adjustment state of the shooting lens on the basis of the set standard block;

wherein when all blocks in which the level of confidence of the defocus amount has been determined to be high are determined by the periodic subject determination device to have periodic pattern signals, the standard block setting device setting as the standard block the block with the smallest defocus amount out of all of the blocks.

4. The focus state detection device according to claim 1, further comprising a filter processor that conducts filter algorithm processes with respect to the pair of signal strings output from the pair of photoelectric conversion element arrays, the filter processor outputting resulting filter process data composed of certain frequency signal components, wherein the algorithm range setting device divides the resulting filter process data into blocks and wherein the focus state detection algorithm device determines whether the level of confidence is high on the basis of the resulting filter process data, the periodic subject determination device determining whether the resulting filter process data is a periodic pattern signal.

5. A focus state detection device for a camera having a shooting lens, the focus state detection device comprising:

a photoelectric conversion element array composed of a plurality of photoelectric conversion elements, said array outputting a string of signals in accordance with a light intensity distribution of a subject image;

a focus state detection optical system that guides light rays from a subject to the photoelectric conversion element array, the focus state detection optical system composing the subject image on the photoelectric conversion element array;

an algorithm range setting device that divides the string of signals into blocks, the blocks becoming the units of focus state detection algorithms;

a focus state detection algorithm device that calculates for each block a value relating to a contrast of the subject image on the basis of the signal string, the focus state detection algorithm device determining the level of confidence of the defocus amount on the basis of the value relating to the contrast;

a standard block setting device that sets as a standard block one of the blocks in which the level of confidence has been determined to be high;

a weighing coefficient setting device that sets a weighing coefficient for a weighted average of the defocus amounts computed for each block on the basis of the value relating to a contrast of the standard block and the defocus amount of the standard block; and a defocus amount combination device that finds the weighted average of the defocus amounts on the basis of the weighing coefficient and determines the final focus adjustment state of the shooting lens on the basis of the weighted average of the defocus amounts.

6. The focus state detection device according to claim 5, further comprising a filter processor that conducts filter algorithm processes with respect to the pair of signal strings output from the pair of photoelectric conversion element arrays, the filter processor outputting resulting filter process data composed of certain frequency signal components, wherein the algorithm range setting device divides the resulting filter process data into blocks and wherein the focus state detection algorithm device determines whether the level of confidence is high on the basis of the resulting filter process data.

7. A focus state detection device for a camera having a shooting lens, the focus state detection device comprising:

a pair of photoelectric conversion element arrays, each composed of a plurality of photoelectric conversion elements, each said array outputting a string of signals in accordance with a light intensity distribution of a subject image;

a focus state detection optical system that guides light rays from a subject to the pair of photoelectric conversion element arrays, the focus state detection optical system composing the subject image on the pair of photoelectric conversion element arrays;

an algorithm range setting device that divides the pair of signal strings into blocks, the blocks becoming the units of focus state detection algorithms;

a subject pattern determination device that determines for each block whether the block is a difficult subject block indicating that focus state detection is difficult, said determination being made on the basis of at least one of the signal strings;

a threshold value setting device that, when it is determined by the subject pattern determination device that the block is a difficult subject block, sets the threshold value that is the criterion for determining the level of confidence of the algorithm result to a strict value in comparison to the case when it has been determined that the block is not a difficult subject block; and a focus state detection algorithm device that causes for each block a relative shift between the signal strings and calculates a correlation amount for the shifted signal strings, the focus state detection algorithm device computing the algorithm result for each block on the basis of the correlation amount and determining the level of confidence of the defocus amount on the basis of the threshold value.

8. The focus state detection device according to claim 7, further comprising a filter processor that conducts filter algorithm processes with respect to the pair of signal strings output from the pair of photoelectric conversion element arrays, the filter processor outputting resulting filter process data in which the DC component has been partially diminished so that the DC component is not completely eliminated, wherein the algorithm range setting device divides the resulting filter process data into blocks and wherein the subject pattern determination device determines whether a block is a difficult subject block on the basis of the resulting filter process data, the focus state detection algorithm device determining the level of confidence of the computed defocus amount on the basis of the resulting filter process data.

9. A focus state detection device for a camera having a shooting lens, the focus state detection device comprising:

a pair of photoelectric conversion element arrays, each composed of a plurality of photoelectric conversion elements, with each array outputting a string of signals in accordance with a light intensity distribution of a subject image;

a focus state detection optical system that guides the light rays from a subject to the pair of photoelectric conversion element arrays, the focus state detection optical system composing the subject image on the pair of photoelectric conversion element arrays;

an algorithm range setting device that sets at least a portion of the pair of signal strings output from the pair of photoelectric conversion element arrays as a focus state detection algorithm region;

a subject pattern determination device that determines whether the focus state detection algorithm region is a difficult subject region indicating that focus state detection is difficult, said determination being made on the basis of at least one of the pair of signal strings;

a threshold value setting device that, when it is determined by the subject pattern determination device that the region is a difficult subject region, sets a threshold value that is a criterion for determining a level of confidence of the algorithm result to a strict value in comparison to the case when it has been determined that the region is not a difficult subject region; and a focus state detection algorithm device that causes a relative shift between the pairs of signal strings and calculates a correlation amount for the pair of shifted signal strings, the focus state detection algorithm device computing the algorithm result on the basis of the correlation amount and determining the level of confidence of the algorithm result on the basis of the threshold value.

10. The focus state detection device according to claim 9, further comprising a filter processor that conducts filter algorithm processes with respect to the pair of signal strings output from the pair of photoelectric conversion element arrays and outputs resulting filter process data in which a DC component has been partially extracted so that the DC component is not completely eliminated, wherein the algorithm range setting device sets at least a portion of the resulting filter process data as focus state detection algorithm regions, the subject pattern determination device determining whether a region of said regions is a difficult subject region on the basis of the resulting filter process data, wherein the focus state detection algorithm device determines whether the level of confidence is high on the basis of the resulting filter process data.

11. A method of focus state detection for a camera having a shooting lens, a photoelectric conversion element array composed of a plurality of photoelectric conversion elements, said array outputting a string of signals in accordance with a light intensity distribution of a subject image, and a focus state detection optical system that guides light rays from a subject to the photoelectric conversion element array, the focus state detection optical system composing a subject image on the photoelectric conversion element array, the method comprising:

extracting, with a filter processor, various frequency components from the signal string output from the photoelectric conversion element array, the filter processor conducting one of the plurality of filter algorithm processes on the signal string and outputting resulting filter process data;

dividing the filter process data into blocks, the blocks becoming the units of focus state detection algorithms;

calculating a defocus amount for each block on the basis of the filter process data and determining a level of confidence of the defocus amount;

dividing the signal string output from the photoelectric conversion array into a plurality of regions with the blocks being the boundaries, and for each of the plurality of regions, determining that focus state detection is possible in a respective region when the level of confidence is determined to be high in at least one of the blocks contained in the region, and when focus state detection is determined to be possible in all of the plurality of regions or all said filter processor processings end, halting the operation of the filter processor, an algorithm range setting device and a focus state detection algorithm device; and determining the final focus adjustment state corresponding to the focus state detection determination.

12. The method according to claim 11, further comprising conducting, with the filter algorithm processor, processes from filter algorithm processes that extract high frequency components to filter algorithm processes that extract low frequency components and conducting the plurality of filter algorithm processes in descending order of frequency components that are extracted.

13. A method of focus state detection device for a camera having a shooting lens, a pair of photoelectric conversion element arrays, each composed of a plurality of photoelectric conversion elements, each said array outputting a string of signals in accordance with a light intensity distribution of a subject image, and a focus state detection optical system that guides light rays from a subject to the pair of photoelectric conversion element arrays, the focus state detection optical system composing the subject image on the pair of photoelectric conversion element arrays, wherein for each block a relative shift is caused between the pairs of signal strings and a correlation amount is calculated for the pair of signal strings, the level of confidence of the defocus amount calculated for each block being determined on the basis of the correlation amount, the method comprising:

dividing the pair of signal strings into blocks, the blocks becoming the units of focus state detection algorithms;

determining for each block whether the pair of signal strings is a periodic pattern signal;

when at least one block exists in which it is determined by the periodic subject determination device that the signals are not periodic pattern signals while the level of confidence of the defocus amount has been determined to be high, setting one of the blocks to be a standard block and determining the final focus adjustment state of the shooting lens on the basis of the set standard block; and determining a final focus adjustment state of the shooting lens on the basis of the set standard block;

wherein when all blocks in which the level of confidence of the defocus amount has been determined to be high are determined to have periodic pattern signals, the method comprising setting as the standard block the block with the smallest defocus amount out of all of the blocks.

14. The focus state detection device according to claim 1, further comprising:

conducting, with a filter processor, filter algorithm processes with respect to the pair of signal strings output from the pair of photoelectric conversion element arrays, the filter processor outputting resulting filter process data composed of certain frequency signal components;

dividing the resulting filter process data into blocks;

determining whether the level of confidence is high on the basis of the resulting filter process data; and determining whether the resulting filter process data is a periodic pattern signal.

15. A method of focus state detection for a camera having a shooting lens, a photoelectric conversion element array composed of a plurality of photoelectric conversion elements, said array outputting a string of signals in accordance with a light intensity distribution of a subject image, and a focus state detection optical system that guides light rays from a subject to the photoelectric conversion element array, the focus state detection optical system composing a subject image on the photoelectric conversion element array, the method comprising:

dividing the filter process data into blocks, the blocks becoming the units of focus state detection algorithms;

calculating for each block a defocus amount and value relating to a contrast of the subject image on the basis of the signal string and determining the level of confidence of the defocus amount on the basis of the value relating to the contrast;

setting as a standard block one of the blocks in which the level of confidence has been determined to be high;

setting a weighing coefficient for a weighted average of the defocus amounts computed for each block on the basis of the value relating to a contrast of the standard block and the defocus amount of the standard block; and finding the weighted average of the defocus amounts on the basis of the weighing coefficient and determining the final focus adjustment state of the shooting lens on the basis of the weighted average of the defocus amounts.

16. The method according to claim 15, further comprising:

conducting, with a filter processor, filter algorithm processes with respect to the pair of signal strings output from the pair of photoelectric conversion element arrays, the filter processor outputting resulting filter process data composed of certain frequency signal components;

dividing the resulting filter process data into blocks; and determining whether the level of confidence is high on the basis of the resulting filter process data.

17. A method of focus state detection device for a camera having a shooting lens, a pair of photoelectric conversion element arrays, each composed of a plurality of photoelectric conversion elements, each said array outputting a string of signals in accordance with a light intensity distribution of a subject image, and a focus state detection optical system that guides light rays from a subject to the pair of photoelectric conversion element arrays, the focus state detection optical system composing the subject image on the pair of photoelectric conversion element arrays, the method comprising:

dividing the pair of signal strings into blocks, the blocks becoming the units of focus state detection algorithms;

determining for each block whether the block is a difficult subject block indicating that focus state detection is difficult, said determination being made on the basis of at least one of the signal strings;

when it is determined that the block is a difficult subject block, the method comprising setting the threshold value that is the criterion for determining the level of confidence of the algorithm result to a strict value in comparison to the case when it has been determined that the block is not a difficult subject block;

causing for each block a relative shift between the signal strings;

calculating a correlation amount for the shifted signal strings;

computing the algorithm result for each block on the basis of the correlation amount; and determining the level of confidence of the defocus amount on the basis of the threshold value.

18. The method according to claim 17, further comprising:

conducting filter algorithm processes with respect to the pair of signal strings output from the pair of photoelectric conversion element arrays, the filter processor outputting resulting filter process data in which the DC component has been partially extracted so that the DC component is not completely eliminated;

dividing the resulting filter process data into blocks;

determining whether a block is a difficult subject block on the basis of the resulting filter process data; and determining the level of confidence of the computed defocus amount on the basis of the resulting filter process data.

19. A method of focus state detection for a camera having a shooting lens, a pair of photoelectric conversion element arrays, each composed of a plurality of photoelectric conversion elements, with each array outputting a string of signals in accordance with a light intensity distribution of a subject image, and a focus state detection optical system that guides the light rays from a subject to the pair of photoelectric conversion element arrays, subject images being composed on the pair of photoelectric conversion element arrays, the method comprising:

setting at least a portion of the pair of signal strings output from the pair of photoelectric conversion element arrays as a focus state detection algorithm region;

determining whether the focus state detection algorithm region is a difficult subject region indicating that focus state detection is difficult, said determination being made on the basis of at least one of the pair of signal strings;

when it is determined by the subject pattern determination device that the region is a difficult subject region, the method comprising setting a threshold value that is a criterion for determining a level of confidence of the algorithm result to a strict value in comparison to the case when it has been determined that the region is not a difficult subject region;

causing a relative shift between the pairs of signal strings;

calculating a correlation amount for the pair of shifted signal strings;

computing the algorithm result on the basis of the correlation amount; and determining the level of confidence of the algorithm result on the basis of the threshold value.

20. The method according to claim 19, wherein the camera further comprises a filter processor that conducts filter algorithm processes with respect to the pair of signal strings output from the pair of photoelectric conversion element arrays and outputs resulting filter process data in which a DC component has been partially extracted so that the DC component is not completely eliminated, the method further comprising:

setting at least a portion of the resulting filter process data as focus state detection algorithm regions;

determining whether a region of said regions is a difficult subject region on the basis of the resulting filter process data; and determining whether the level of confidence is high on the basis of the resulting filter process data.

* * * * *